(12) United States Patent
Senoue

(10) Patent No.: US 12,057,586 B2
(45) Date of Patent: Aug. 6, 2024

(54) BATTERY AND METHOD OF PRODUCING THE SAME

(71) Applicant: TOYOTA JIDOSHA KABUSHIKI KAISHA, Toyota (JP)

(72) Inventor: Masaharu Senoue, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/365,635

(22) Filed: Jul. 1, 2021

(65) Prior Publication Data

US 2022/0006095 A1    Jan. 6, 2022

(30) Foreign Application Priority Data

Jul. 6, 2020 (JP) ................................. 2020-116213

(51) Int. Cl.
| | | |
|---|---|---|
| *H01M 4/72* | (2006.01) | |
| *H01M 4/02* | (2006.01) | |
| *H01M 4/04* | (2006.01) | |

(52) U.S. Cl.
CPC ........... *H01M 4/72* (2013.01); *H01M 4/0404* (2013.01); *H01M 4/0433* (2013.01); *H01M 2004/027* (2013.01); *H01M 2004/028* (2013.01)

(58) Field of Classification Search
CPC .... H01M 4/72; H01M 4/0404; H01M 4/0433; H01M 2004/027; H01M 2004/028
See application file for complete search history.

(56) References Cited

U.S. PATENT DOCUMENTS

| 8,492,027 B2 | 7/2013 | Uetani et al. |
| 8,900,331 B2 * | 12/2014 | Ramasubramanian ...................... H01M 10/0525 29/623.1 |
| 11,450,890 B2 * | 9/2022 | Senoue .................. H01M 4/13 |
| 2020/0161663 A1 * | 5/2020 | Cabrera ............... H01M 12/08 |

FOREIGN PATENT DOCUMENTS

| CN | 110085905 A | 8/2019 |
| JP | H10-199545 A | 7/1998 |
| JP | 2001-126736 A | 5/2001 |
| JP | 2007-297644 A | 11/2007 |
| JP | 5511604 B2 | 6/2014 |
| JP | 2014-522087 A | 8/2014 |
| WO | 2013/019983 A1 | 2/2013 |

* cited by examiner

Primary Examiner — Cynthia H Kelly
Assistant Examiner — Niara Trant
(74) Attorney, Agent, or Firm — Oliff PLC

(57) ABSTRACT

A battery includes a positive electrode, a negative electrode, and a separator. The negative electrode forms a honeycomb core. The honeycomb core includes a first face, a second face, a partition, and a circumferential wall. The second face faces the first face. The partition is formed between the first face and the second face. The partition extends in a grid pattern to separate a plurality of hollow cells. The circumferential wall surrounds a circumference of the partition. The separator includes a first layer and a second layer. The first layer covers at least part of the partition. The second layer covers at least part of the first face and the second face. The positive electrode includes a first region and a second region. The first region is inserted in the hollow cells. The second region extends outwardly beyond the second layer of the separator.

17 Claims, 16 Drawing Sheets

BATTERY AND METHOD OF PRODUCING THE SAME

This nonprovisional application is based on Japanese Patent Application No. 2020-116213 filed on Jul. 6, 2020, with the Japan Patent Office, the entire contents of which are hereby incorporated by reference.

BACKGROUND

Field

The present disclosure relates to a battery and a method of producing the same.

Description of the Background Art

Japanese Patent Laying-Open No. 2001-126736 discloses an electrode, which is produced by forming a titanium nitride film on a surface of a partition of a cell and also on an outer surface of a carbonaceous honeycomb structure to form a honeycomb-structure current collector, and then inserting a positive electrode or negative electrode active material into the cell.

SUMMARY

FIG. 18 is a schematic cross-sectional view illustrating an example of a conventional battery element.

The conventional battery element includes a stacked body 150. Stacked body 150 has a two-dimensional structure. Stacked body 150 is made of sheet-shaped electrodes. More specifically, stacked body 150 is made by stacking a positive electrode sheet 110, a separator sheet 130, and a negative electrode sheet 120. In the two-dimensional structure, the positive electrode and the negative electrode are adjacent to each other in a plane.

The electrode sheet includes an electrode composite material layer. The electrode composite material layer includes an electrode active material. Typically, an electrode active material is in particle form. Particles are less likely to form a self-standing layer. Therefore, a current-collecting foil (a current collector) is used as a support for the electrode composite material layer. For example, a positive electrode paste is applied to a surface of a positive electrode current-collecting foil 111 to form a positive electrode composite material layer 112. For example, a negative electrode paste is applied to a surface of a negative electrode current-collecting foil 121 to form a negative electrode composite material layer 122.

Positive electrode current-collecting foil 111 is an aluminum (Al) foil, for example. Negative electrode current-collecting foil 121 is a copper (Cu) foil, for example. Since the current-collecting foil does not directly contribute to battery capacity, when the current-collecting foil is reduced, the filling factor of the electrode active material increases accordingly, potentially leading to an increased battery capacity and thus resulting in a reduced cost of current collector material.

The electrode active material may include a noble metal and the like. For example, resource recycling of the noble metal and the like may be considered. If the electrode composite material layer is supported by a current-collecting foil, resource recycling of the noble metal and the like requires an extra step for separating the current-collecting foil from the electrode active material.

However, no alternative method for disposing positive and negative electrodes has been developed that is comparable in cost efficiency and in mass productivity to conventional approaches using a current-collecting foil as a support.

An object of the present disclosure is to provide a battery in which a current collector can be reduced.

Hereinafter, the technical configuration and the action mechanism of the present disclosure will be described. It should be noted that the action mechanism according to the present disclosure includes presumption. The scope of claims should not be limited by whether or not the action mechanism is correct.

[1] A battery according to the present disclosure includes a positive electrode, a negative electrode, and a separator.

The negative electrode forms a honeycomb core. The honeycomb core includes a first face, a second face, a partition, and a circumferential wall. The second face faces the first face. The partition is formed between the first face and the second face. In a cross section parallel to the first face, the partition extends in a grid pattern to separate a plurality of hollow cells. In a cross section parallel to the first face, the circumferential wall surrounds a circumference of the partition. Each of the hollow cells penetrates the honeycomb core in a direction from the first face toward the second face.

The separator spatially separates the positive electrode from the negative electrode. The separator includes a first layer and a second layer. The first layer covers at least part of the partition. The second layer covers at least part of the first face and the second face.

The positive electrode includes a first region and a second region. The first region is inserted in the hollow cells. In a cross section perpendicular to the first face, the second region extends outwardly beyond the second layer of the separator.

A battery element includes a positive electrode, a negative electrode, and a separator. The battery element according to the present disclosure has a three-dimensional structure. In the three-dimensional structure, the positive electrode and the negative electrode are adjacent to each other in a three-dimensional manner. The negative electrode forms a honeycomb core. The honeycomb core has a plurality of hollow cells (through holes) in it. In each of the hollow cells, a columnar positive electrode, for example, is inserted.

The honeycomb core may have a high strength attributed to its structure. Therefore, the negative electrode (the honeycomb core) may not require a current collector to support it. The positive electrode is surrounded by the partition of the honeycomb core. The positive electrode is supported by the partition. The positive electrode may also not require a current collector to support it.

In the three-dimensional structure according to the present disclosure, the facing area between the positive electrode and the negative electrode, namely the area of either the positive electrode or the negative electrode facing the other, can be larger than in a conventional two-dimensional structure. The increased facing area may lead to a decreased battery resistance. Therefore, intended battery capacity may still be achieved with a reduced current collector.

The three-dimensional structure according to the present disclosure may be a structure in which no current collector is present between the positive electrode and the negative electrode. For example, currents may be collected by the second region of the positive electrode (the region extending beyond the separator). For example, currents may be collected by the circumferential wall and the like of the negative electrode (the honeycomb core). In other words, a current-collecting member may be positioned outside the battery element. When there is no current collector present between the positive electrode and the negative electrode, the filling factor of the electrode active material in the battery element may be enhanced. Further, detaching the current-collecting member becomes easy, potentially enabling easy recovery of the electrode active material. Namely, the battery according to the present disclosure may also have a high recyclability.

[2] The honeycomb core may have a height of 3 mm or more. The height of the honeycomb core refers to the distance between the first face and the second face.

When the honeycomb core has a height of 3 mm or more, the strength of the honeycomb core may be remarkably enhanced. Also, the ratio of electrode active material in the battery element may increase, and accordingly the battery capacity may increase.

[3] In the cross section parallel to the first face, each of the hollow cells may have a cross-sectional area of 900 μm² or more, for example.

When the hollow cell has a cross-sectional area of 900 μm² or more, battery capacity may be increased, for example.

[4] In the cross section parallel to the first face, each of the hollow cells may have, for example, a tetragonal contour or a hexagonal contour.

When the hollow cells have a tetragonal contour or a hexagonal contour, the hollow cell integration degree in the honeycomb core may be enhanced, for example. When the integration degree is thus enhanced, the facing area between the positive electrode and the negative electrode may increase, for example. As a result, power output may be enhanced, for example.

[5] The partition may have a thickness from 20 μm to 350 μm, for example.

When the partition has a thickness of 20 μm or more, the strength of the honeycomb core may be enhanced, for example. When the partition has a thickness of 350 μm or less, battery resistance may be reduced, for example.

[6] The battery may further include a positive electrode current-collecting member and a negative electrode current-collecting member. The positive electrode current-collecting member may be connected to the second region of the positive electrode. The negative electrode current-collecting member may be connected to the circumferential wall.

For example, the second region of the positive electrode and the circumferential wall of the honeycomb core (the negative electrode) may collect electric currents. In the current-collecting structure according to [6] above, the positive electrode may have an increased current-collecting area, for example. This may reduce a resistance factor attributed to the positive electrode.

[7] The battery may further include a positive electrode current-collecting member and a negative electrode current-collecting member. In the direction from the first face toward the second face, the positive electrode current-collecting member and the negative electrode current-collecting member may be on opposite sides of the honeycomb core. The positive electrode current-collecting member may be connected to the second region of the positive electrode. The negative electrode current-collecting member may be connected to the second face exposed from the second layer.

For example, the second region of the positive electrode and a main face of the honeycomb core (the negative electrode) may collect electric currents. In the current-collecting structure according to [7] above, arrangement of the parts may be simplified. As a result, recyclability may be enhanced, for example.

[8] As to the separator, the first layer includes a first insulation material, and the second layer includes a second insulation material. The second insulation material may be different from the first insulation material.

When the second insulation material is different from the first insulation material, flexibility of the method of forming the second layer and the first layer may be enhanced, for example. For example, the method of forming the first layer may be different from the method of forming the second layer.

[9] In the method of producing a battery according to the present disclosure, a battery including a negative electrode forming a honeycomb core is produced.

The honeycomb core includes a first face, a second face, a partition, and a circumferential wall. The second face faces the first face. The partition is formed between the first face and the second face. In a cross section parallel to the first face, the partition extends in a grid pattern to separate a plurality of hollow cells. In a cross section parallel to the first face, the circumferential wall surrounds a circumference of the partition. Each of the hollow cells penetrates the honeycomb core in a direction from the first face toward the second face.

The method of producing a battery according to the present disclosure includes the following (A), (B), and (C):
(A) molding the honeycomb core from a negative electrode paste;
(B) forming a separator covering a surface of the honeycomb core; and
(C) after the forming a separator, forming a positive electrode by injecting a positive electrode paste into the hollow cells within the honeycomb core.

The separator is formed so as to spatially separate the positive electrode from the negative electrode. The separator is formed so as to include a first layer and a second layer. The first layer covers at least part of the partition. The second layer covers at least part of the first face and the second face.

The positive electrode is formed so as to include a first region and a second region. The first region is inserted in the hollow cells. In a cross section perpendicular to the first face, the second region extends outwardly beyond the second layer of the separator.

By the method of producing a battery according to the present disclosure, the battery according to [1] above may be produced.

[10] In the method of producing a battery according to the present disclosure, molding the honeycomb core from a negative electrode paste may be performed by, for example, extrusion molding.

[11] In the method of producing a battery according to the present disclosure, the first layer may be formed by, for example, sucking a separator paste from the first face or the second face into the honeycomb core. The separator paste includes a first insulation material.

[12] In the method of producing a battery according to the present disclosure, the second layer may be formed by, for example, depositing a second insulation material on the first face and the second face by electrodeposition.

[13] In the method of producing a battery according to the present disclosure, the second insulation material may be different from the first insulation material, for example.

[14] The method of producing a battery according to the present disclosure may further include the following (D);

(D) connecting a positive electrode current-collecting member to the positive electrode, and connecting a negative electrode current-collecting member to the negative electrode.

The positive electrode current-collecting member may be connected to the second region of the positive electrode. The negative electrode current-collecting member may be connected to the circumferential wall.

[15] The method of producing a battery according to the present disclosure may further include the following (D);

(D) connecting a positive electrode current-collecting member to the positive electrode, and connecting a negative electrode current-collecting member to the negative electrode.

In the direction from the first face toward the second face, the positive electrode current-collecting member and the negative electrode current-collecting member may be on opposite sides of the honeycomb core. The positive electrode current-collecting member may be connected to the second region of the positive electrode. The negative electrode current-collecting member may be connected to the second face exposed from the second layer.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Next, an embodiment of the present disclosure (called "the present embodiment" hereinafter) will be described. It should be noted that the below description does not limit the scope of claims.

A geometric term in the present embodiment (such as "parallel", "perpendicular", or "square", for example) may refer to a geometric state that is substantially the same as the exact meaning of the term. Any geometric term in the present embodiment should not be interpreted solely in its exact meaning. For example, the term "parallel" refers to a substantially parallel state; that is, the term "parallel" may mean a geometric state that is deviated, to some extent, from exact parallel. For example, the "substantially parallel state" may include tolerances and/or errors in terms of design, production, and/or the like, as a matter of course.

In the present embodiment, an expression such as "from 0.1 parts by mass to 10 parts by mass" means a range that includes both the boundary values, unless otherwise specified. For example, "from 0.1 parts by mass to 10 parts by mass" means a range of "not less than 0.1 parts by mass and not more than 10 parts by mass".

In the present embodiment, the expression "consist essentially of" means that an additional component may also be included in addition to essential components, unless an object of the present invention is impaired. For example, components usually expected in the relevant technical field (such as inevitable impurities, for example) may also be included as a matter of course.

In the present embodiment, when a compound is represented by a stoichiometric composition formula such as "$Li_2S$", this stoichiometric composition formula is merely a typical example. When lithium sulfide is represented as "$Li_2S$", for example, the composition ratio of lithium sulfide is not limited to "Li:S=2:1" but Li and S may be included in any composition ratio.

In the present embodiment, as an example of a battery, "a lithium-ion battery" will be described. However, a battery may be any battery system. For example, the battery according to the present embodiment may be "a sodium-ion battery", "a nickel-metal hydride battery", and/or the like.

The battery according to the present embodiment may be used in any application. For example, the battery according to the present embodiment may be used in mobile terminals, portable devices, stationary power storages, electric vehicles, hybrid vehicles, and the like.

<Battery>

Figure 1:
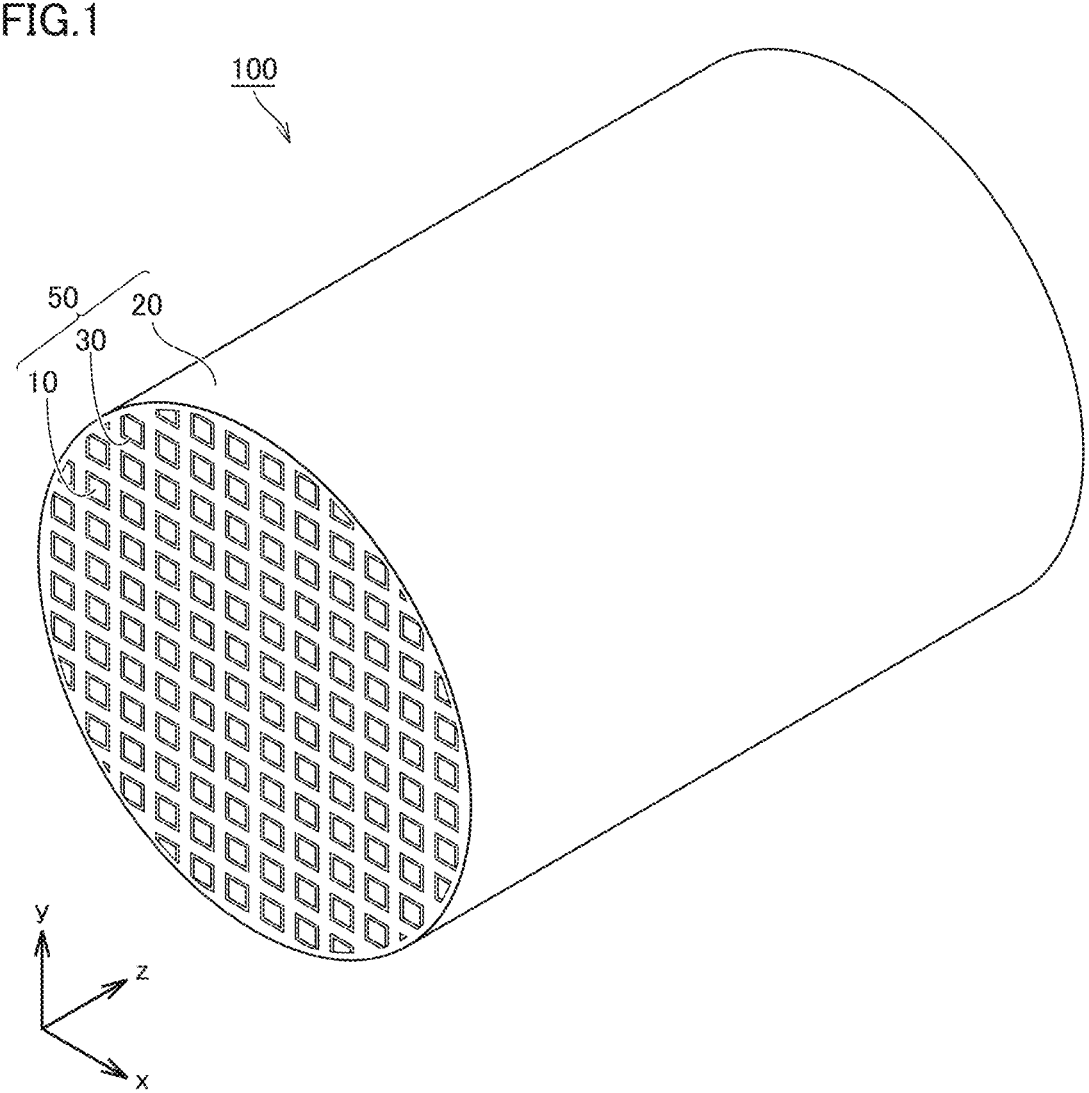
FIG. 1 is a schematic view illustrating an example of the battery according to the present embodiment.

FIG. 1 is a schematic view illustrating an example of the battery according to the present embodiment.

A battery 100 includes a battery element 50. Battery element 50 has a three-dimensional structure. Battery element 50 includes a positive electrode 10, a negative electrode 20, and a separator 30. In other words, battery 100 includes positive electrode 10, negative electrode 20, and separator 30.

Battery 100 may include a battery casing (not illustrated), for example. The battery casing may accommodate battery element 50. The battery casing may be hermetically sealed. The battery casing may be a pouch made of an Al-laminated film, for example. The battery casing may be a metal container, for example. The battery casing may have any outer profile. The outer profile of the battery casing may be prismatic, cylindrical, coin-shaped, flat, or thin (sheet-like), for example.

<<Negative Electrode>>

Figure 2:
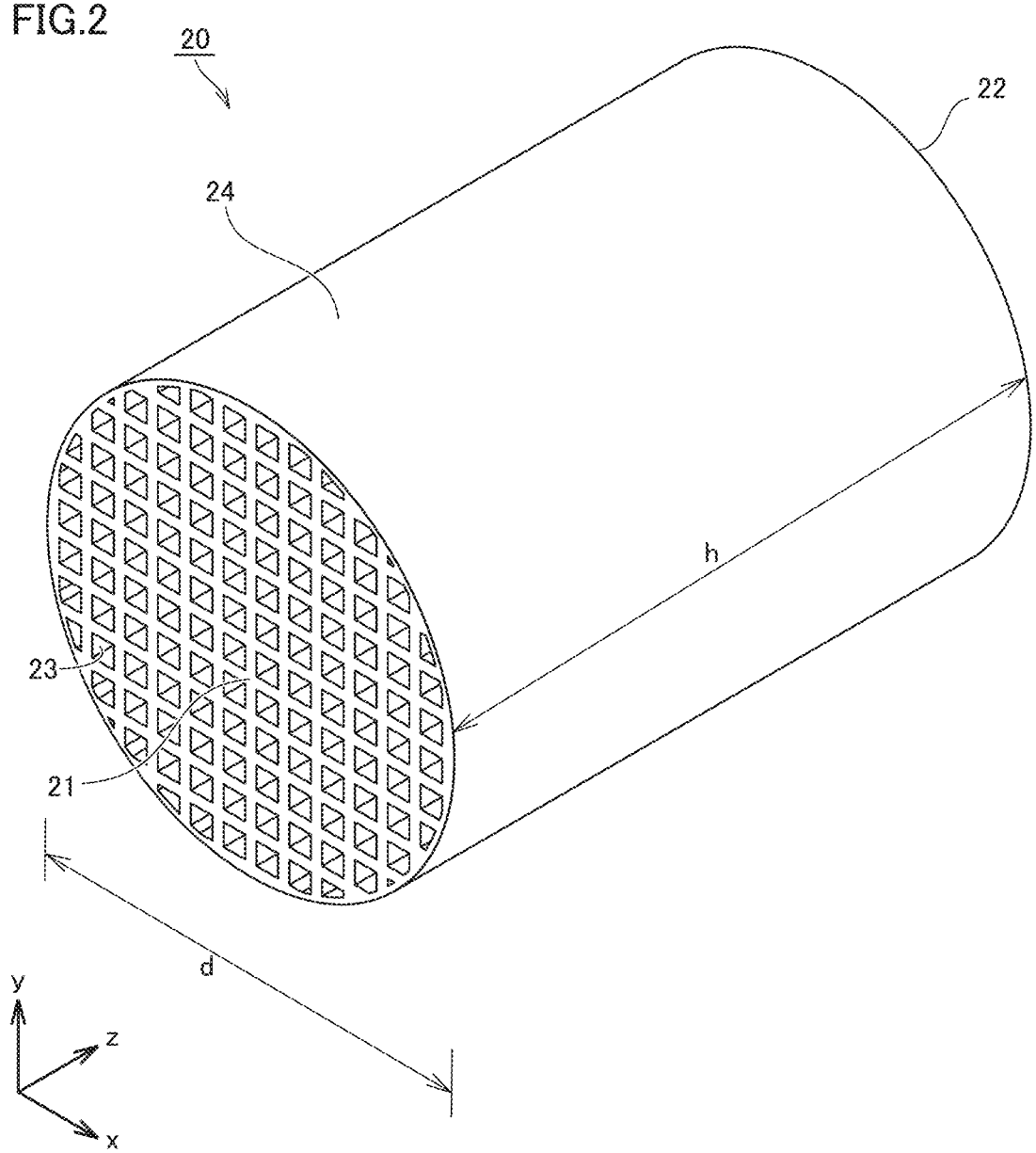
FIG. 2 is a schematic view illustrating an example of the negative electrode according to the present embodiment.

FIG. 2 is a schematic view illustrating an example of the negative electrode according to the present embodiment.

Negative electrode 20 is an electrode that has a lower electric potential than positive electrode 10. Negative electrode 20 includes a negative electrode active material. For example, negative electrode 20 may consist essentially of a negative electrode active material. Negative electrode 20 forms a honeycomb core. The honeycomb core may also be called "honeycomb structure", "honeycomb molded body", and the like. The honeycomb core in FIG. 2 has a cylindrical outer profile. However, the honeycomb core may have any outer profile. For example, the outer profile of the honeycomb core may be disc-like, square-cornered, or prism-like.

The honeycomb core according to the present embodiment may be a molded body of the negative electrode active material, for example. The honeycomb core may be a molded body of a negative electrode composite material, for example. The negative electrode composite material may further include, in addition to the negative electrode active material, a conductive material, a binder, and/or the like.

The negative electrode active material may be particles, for example. The negative electrode active material may have a median diameter from 1 μm to 30 μm, for example. The "median diameter" refers to a particle size in volume-based particle size distribution at which the cumulative particle volume (accumulated from the side of small sizes) reaches 50% of the total particle volume. The median diameter may be measured with a laser-diffraction particle size distribution analyzer.

The negative electrode active material may include an optional component. The negative electrode active material may include, for example, at least one selected from the group consisting of graphite, hard carbon, soft carbon, silicon, silicon oxide, tin, tin oxide, and lithium titanium oxide. The conductive material may include an optional component. The conductive material may include, for example, at least one selected from the group consisting of carbon black (for example, acetylene black), carbon fibers, metal particles, and metal fibers. The amount of the conductive material may be, for example, from 0.1 parts by mass to 10 parts by mass relative to 100 parts by mass of the negative electrode active material. The binder may include an optional component. The binder may include, for example, at least one selected from the group consisting of carboxymethylcellulose (CMC), styrene-butadiene rubber (SBR), and polyacrylic acid (PAA). The amount of the binder may be, for example, from 0.1 parts by mass to 10 parts by mass relative to 100 parts by mass of the negative electrode active material.

Negative electrode 20 (the honeycomb core) includes a first face 21, a second face 22, a partition 23, and a circumferential wall 24. Second face 22 faces first face 21. Partition 23 and circumferential wall 24 are formed between first face 21 and second face 22. Partition 23 and circumferential wall 24 connect first face 21 to second face 22.

Each of first face 21 and second face 22 may be flat, for example. Each of first face 21 and second face 22 may be not flat, for example. Each of first face 21 and second face 22 may be curved, for example. First face 21 may be parallel to second face 22. First face 21 may be not parallel to second face 22.

In the present embodiment, the height of the honeycomb core (h) refers to the distance between first face 21 and second face 22. When first face 21 is not parallel to second face 22, the minimum distance between first face 21 and second face 22 is regarded as the height (h). The honeycomb core may have a height (h) of 3 mm or more, for example. When the honeycomb core has a height (h) of 3 mm or more, the strength of the honeycomb core may be remarkably enhanced. Also, the ratio of electrode active material in battery element 50 may increase, and accordingly the battery capacity may increase. The height of the honeycomb core (h) may have an optional upper limit. For example, the honeycomb core may have a height (h) of 1000 mm or less. For example, the honeycomb core may have a height (h) of 500 mm or less. For example, the honeycomb core may have a height (h) of 100 mm or less. For example, the honeycomb core may have a height (h) of 10 mm or less.

In the x-y plane of FIG. 2, the honeycomb core has a diameter (d). The diameter (d) refers to the maximum diameter of the honeycomb core in the x-y plane. The honeycomb core may have any diameter (d). The honeycomb core may have a diameter (d) from 1 mm to 1000 mm, for example. The honeycomb core may have a diameter (d) from 10 mm to 100 mm, for example.

In the present embodiment, the aspect ratio of the honeycomb core (h/d) refers to the ratio of the height (h) to the diameter (d). The honeycomb core may have an aspect ratio (h/d) from 0.1 to 10, for example. The honeycomb core may have an aspect ratio (h/d) from 0.1 to 2, for example. The honeycomb core may have an aspect ratio (h/d) from 0.1 to 1, for example. The honeycomb core may have an aspect ratio (h/d) from 0.1 to 0.5, for example. The honeycomb core may have an aspect ratio (h/d) from 0.15 to 0.5, for example.

Figure 3:
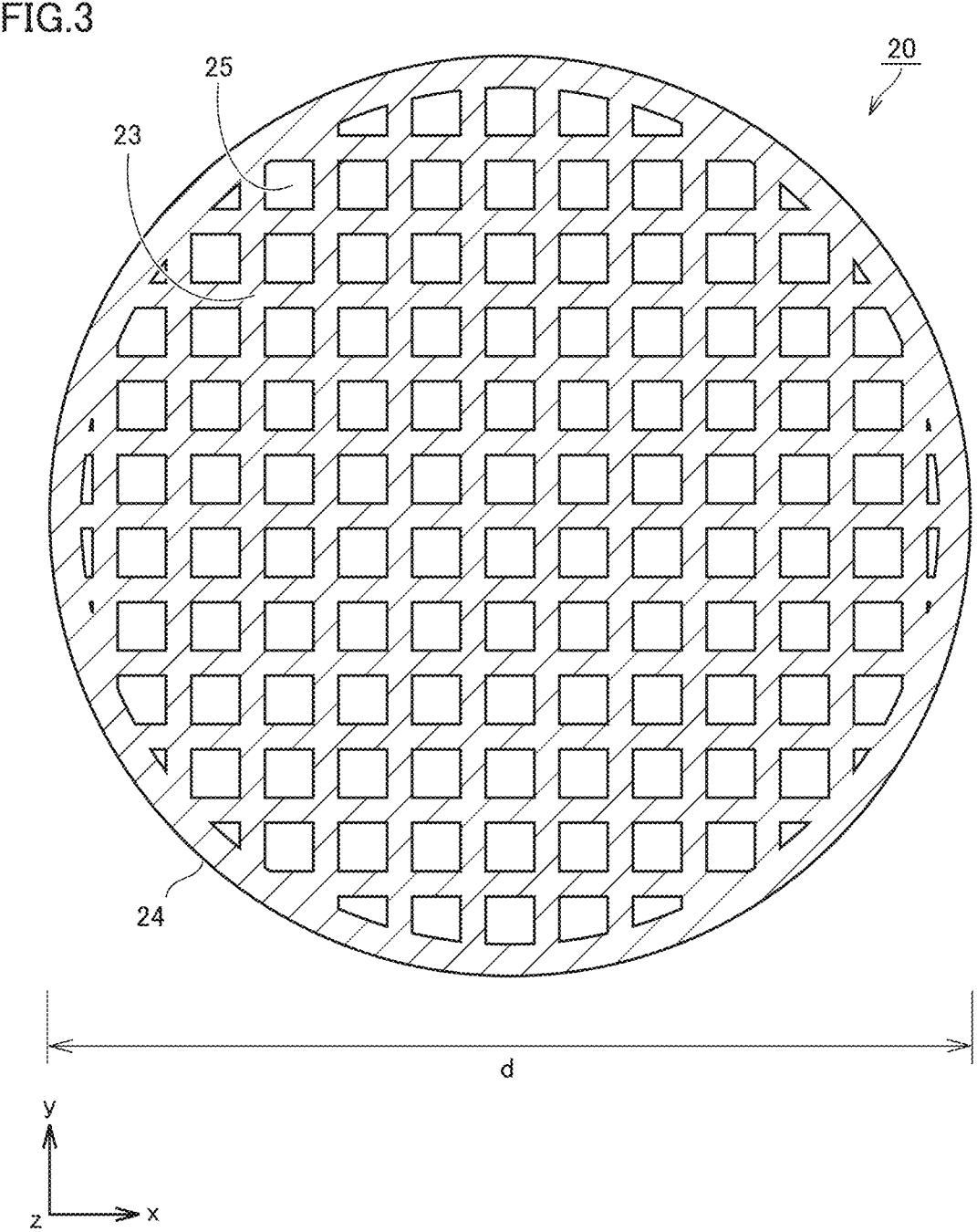
FIG. 3 is a schematic cross-sectional view illustrating an example of a cross section parallel to the x-y plane in FIG. 2.

FIG. 3 is a schematic cross-sectional view illustrating an example of a cross section parallel to the x-y plane in FIG. 2. In the present embodiment, the "cross section parallel to the x-y plane" refers to a "cross section parallel to first face 21 (or second face 22)".

In FIG. 3, partition 23 extends in a grid pattern. Partition 23 separates a plurality of hollow cells 25. Partition 23 may be called "rib", for example. Circumferential wall 24 surrounds a circumference of partition 23.

In a sense, hollow cells 25 are "through holes". Each of hollow cells 25 penetrates the honeycomb core (negative electrode 20) in a direction from first face 21 toward second face 22 (the z-axis direction in FIGS. 1 to 3). In a cross section parallel to the x-y plane, hollow cells 25 are integrated. The distance between hollow cells 25 may be substantially uniform. The distance between hollow cells 25 may be random.

For example, 4 to 10000 hollow cells 25 may be formed in a cross section parallel to the x-y plane. For example, 10 to 5000 hollow cells 25 may be formed in a cross section parallel to the x-y plane. For example, 100 to 5000 hollow cells 25 may be formed in a cross section parallel to the x-y plane. For example, 500 to 5000 hollow cells 25 may be formed in a cross section parallel to the x-y plane. For example, 1000 to 3000 hollow cells 25 may be formed in a cross section parallel to the x-y plane.

In a cross section parallel to the x-y plane, the number density of hollow cells 25 may be from 1 cell/mm² to 10 cells/mm², for example. The number density of hollow cells 25 may be from 2 cells/mm² to 6 cells/mm², for example.

The area fraction of the total cross-sectional area of hollow cells 25 relative to the cross-sectional area of the honeycomb core may be from 50% to 99%, for example. The area fraction of the total cross-sectional area of hollow cells 25 relative to the cross-sectional area of the honeycomb core may be from 70% to 90%, for example. In the present embodiment, the cross-sectional area of the honeycomb core is substantially the same as the area of first face 21 or second face 22.

In a cross section parallel to the x-y plane, each of hollow cells 25 may have any contour. For example, the contour of each of hollow cells 25 may be circular, polygonal (such as triangle, octagonal), or the like.

Figure 4:
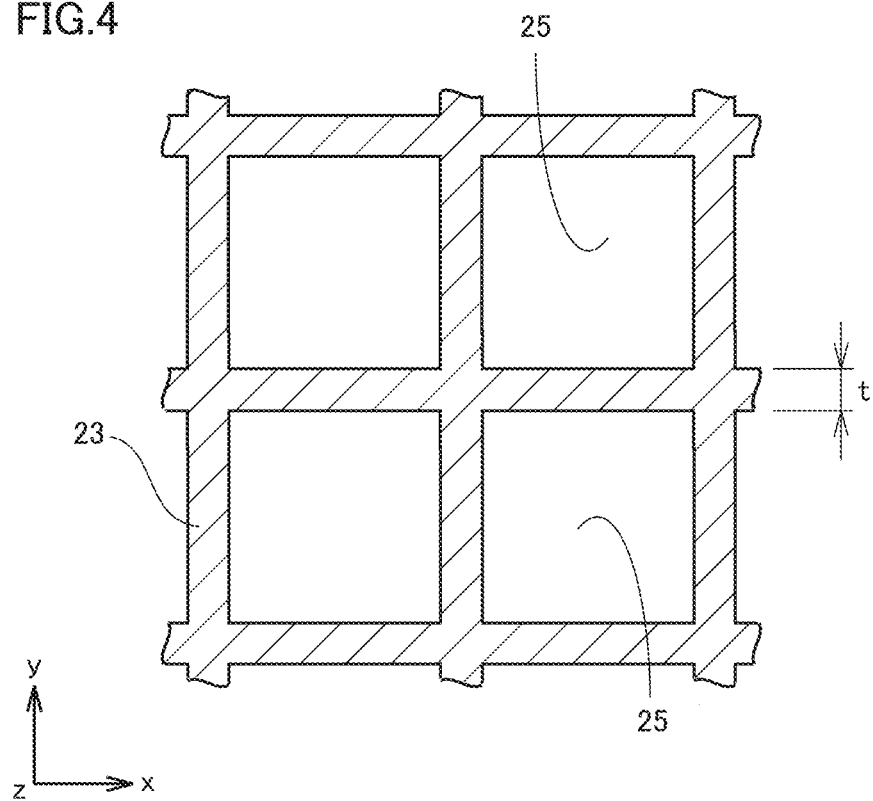
FIG. 4 is a schematic cross-sectional view illustrating a first example of the partition according to the present embodiment.
Figure 5:
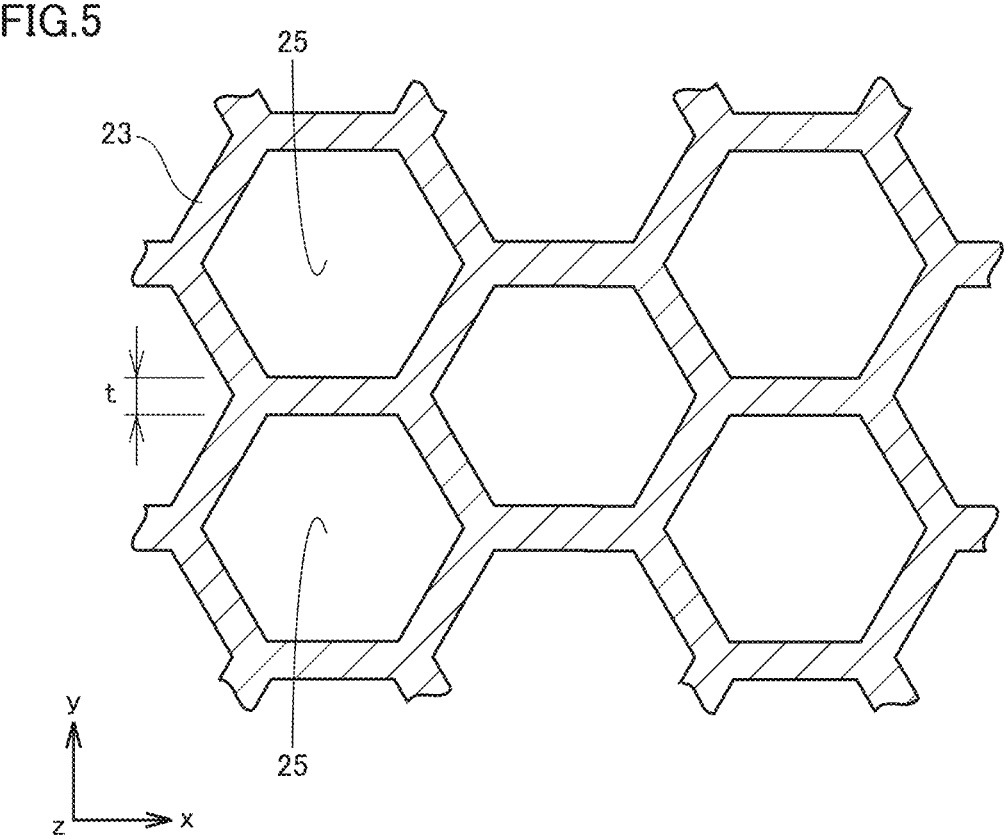
FIG. 5 is a schematic cross-sectional view illustrating a second example of the partition according to the present embodiment.

FIG. 4 is a schematic cross-sectional view illustrating a first example of the partition according to the present embodiment. FIG. 5 is a schematic cross-sectional view illustrating a second example of the partition according to the present embodiment.

Each of hollow cells 25 may have a tetragonal contour or a hexagonal contour, for example. When hollow cells 25 have a tetragonal contour or a hexagonal contour, the integration degree of hollow cells 25 in the honeycomb core may be enhanced, for example. When the integration degree is thus enhanced, the facing area between positive electrode 10 and negative electrode 20 may increase, for example. As a result, power output may be enhanced, for example. The tetragonal includes square, parallelogram-shaped, rhombic, and trapezoidal, for example.

Hollow cells 25 may have the same contour. Hollow cells 25 may have different contours.

Partition 23 may have any thickness (t). The thickness of partition 23 (t) refers to the minimum distance between adjacent hollow cells 25 in a cross section parallel to the x-y plane. Partition 23 may have a thickness (t) from 20 μm to 350 μm, for example. When partition 23 has a thickness (t) of 20 μm or more, the strength of the honeycomb core may be enhanced, for example. When partition 23 has a thickness (t) of 350 μm or less, battery resistance may be reduced, for example. Partition 23 may have a thickness (t) of 140 μm or more, for example.

In a cross section parallel to the x-y plane, each of hollow cells 25 may have a cross-sectional area of 900 μm² or more, for example. When hollow cells 25 has a cross-sectional area of 900 μm² or more, battery capacity may be increased, for example. Each of hollow cells 25 may have a cross-sectional area of 67600 μm² or more, for example. The cross-sectional area may have an optional upper limit. Each of hollow cells 25 may have a cross-sectional area from 900 μm² to 490000 μm², for example. Each of hollow cells 25 may have a cross-sectional area from 900 μm² to 250000 μm², for example. When the cross-sectional area has a specific upper limit, battery resistance may be reduced, for example.

<<Separator>>

Figure 6:
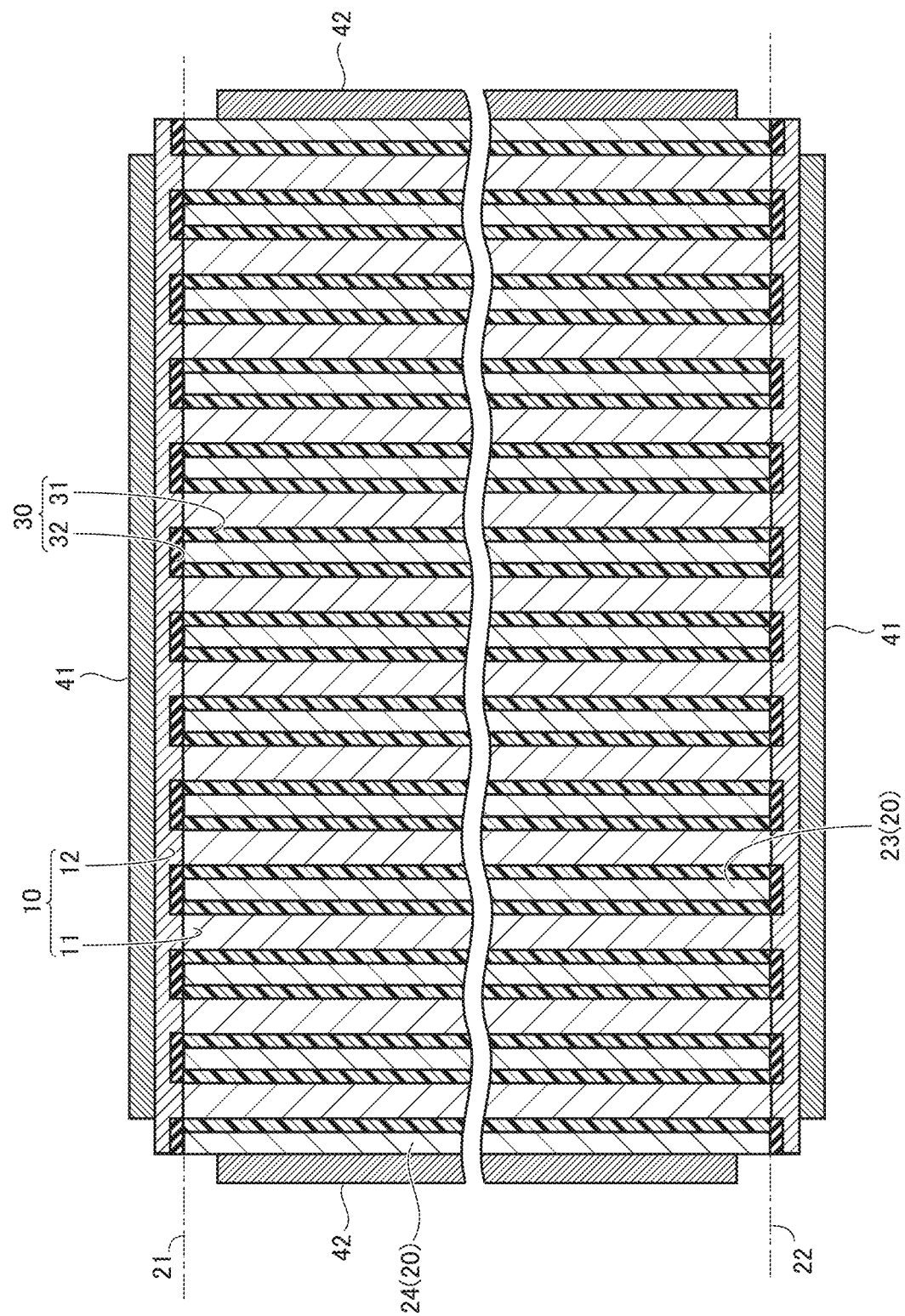
FIG. 6 is a schematic cross-sectional view illustrating an example of a cross section parallel to the y-z plane in FIG. 1.

FIG. 6 is a schematic cross-sectional view illustrating an example of a cross section parallel to the y-z plane in FIG. 1. In the present embodiment, the "cross section parallel to the y-z plane" refers to a "cross section perpendicular to first face 21 (or second face 22)".

Separator 30 spatially separates positive electrode 10 from negative electrode 20. "Spatially separating" refers to having positive electrode 10 not in direct contact with negative electrode 20. Separator 30 includes an insulation material, for example. Separator 30 substantially interrupts electronic conduction between positive electrode 10 and negative electrode 20.

Separator 30 may form a carrier ion conduction path, for example. In a lithium-ion battery, for example, carrier ions are lithium ions. Separator 30 may include a solid electrolyte, for example. When separator 30 includes a solid electrolyte, each of positive electrode 10 and negative electrode 20 may also include a solid electrolyte. The solid electrolyte may include an oxide-based solid electrolyte. The solid electrolyte may include a sulfide-based solid electrolyte, for example. The sulfide-based solid electrolyte may include lithium phosphorus sulfide ($Li_2S$—$P_2S_5$), for example.

Separator 30 may include a gel polymer electrolyte, for example. The gel polymer electrolyte may include a host polymer and an electrolyte solution (to be described below), for example. The host polymer may include, for example, at least one selected from the group consisting of polyvinylidene difluoride (PVDF), vinylidene difluoride-hexafluoropropylene copolymer (PVDF-HFP), polyacrylonitrile (PAN), and polyethylene oxide (PEO).

Separator 30 includes a first layer 31 and a second layer 32. First layer 31 covers at least part of partition 23. First layer 31 may cover substantially the entire partition 23. However, as long as positive electrode 10 is spatially separated from negative electrode 20, first layer 31 may cover only a part of partition 23.

Second layer 32 may be connected with first layer 31. Second layer 32 and first layer 31 may be continuous. Second layer 32 may be not connected with first layer 31. Second layer 32 and first layer 31 may be discontinuous. For example, there may be a gap between second layer 32 and first layer 31.

Second layer 32 covers at least part of first face 21 and second face 22. For example, second layer 32 may cover both of first face 21 and second face 22. For example, second layer 32 may cover only first face 21. For example, second layer 32 may cover substantially the entire first face 21. For example, second layer 32 may cover part of first face 21. For example, second layer 32 may cover only second face 22. For example, second layer 32 may cover substantially the entire second face 22. For example, second layer 32 may cover part of second face 22.

(First Layer)

Inside of hollow cells 25, first layer 31 separates positive electrode 10 from negative electrode 20. First layer 31 includes a first insulation material. First layer 31 may consist essentially of a first insulation material. First layer 31 may further include, for example, a binder and/or the like, in addition to the first insulation material. The first insulation material may be particles, for example. The first insulation material may have a median diameter from 10 nm to 1 μm, for example. The first insulation material may include an optional component. The first insulation material may include, for example, at least one selected from the group consisting of alumina, boehmite, titania, magnesia, and zirconia. The binder may include an optional component. The binder may include, for example, at least one selected from the group consisting of PVDF, PVDF-HFP, and polytetrafluoroethylene (PTFE). The amount of the binder may be, for example, from 1 part by mass to 10 parts by mass relative to 100 parts by mass of the first insulation material.

First layer 31 may have any thickness. The thickness of first layer 31 refers to the dimension in the y-axis direction in FIG. 6. First layer 31 may have a thickness from 1 μm to 100 μm, for example. First layer 31 may have a thickness from 10 μm to 30 μm, for example.

Figure 7:
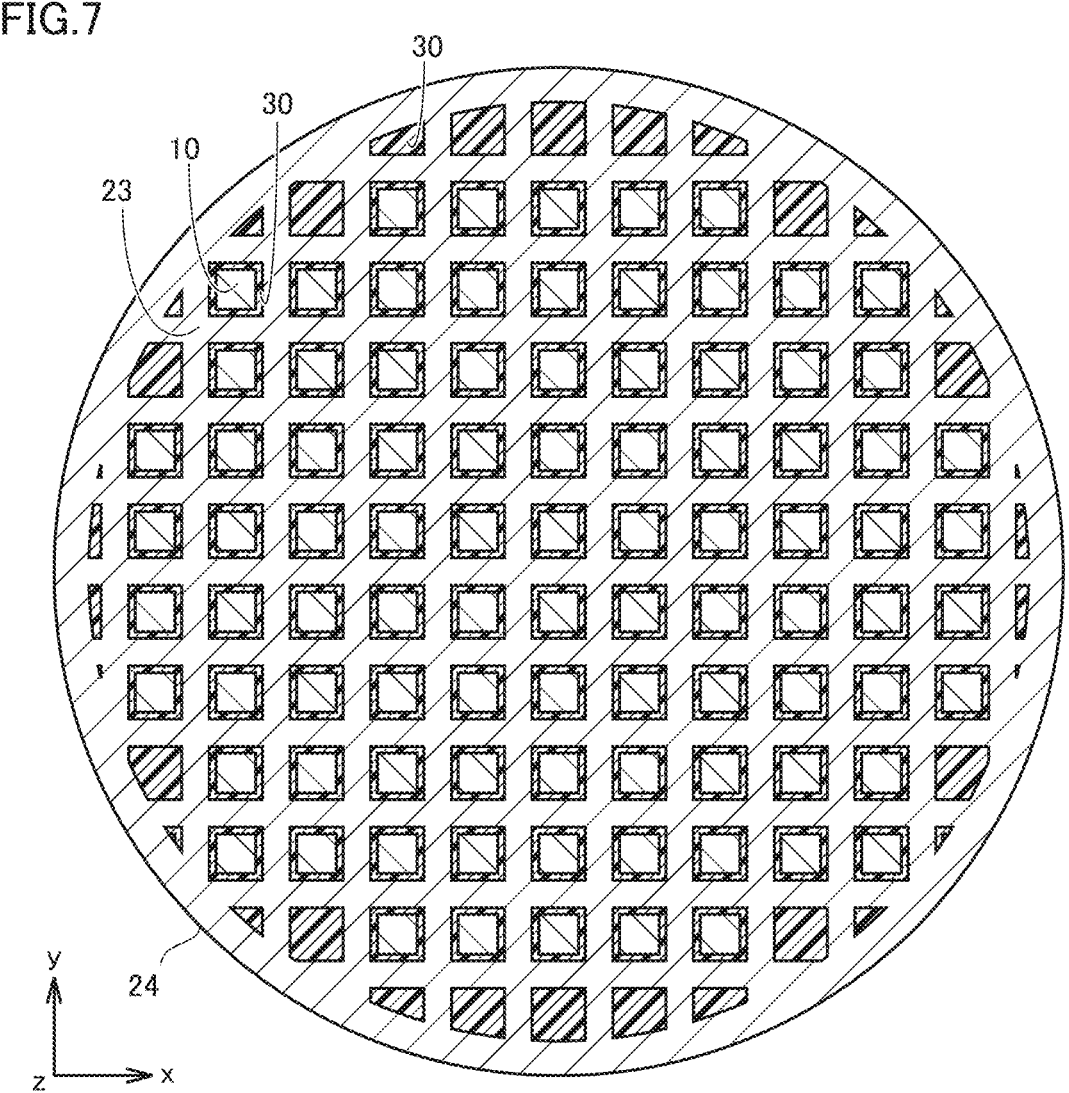
FIG. 7 is a schematic cross-sectional view illustrating an example of a cross section parallel to the x-y plane in FIG. 1.

FIG. 7 is a schematic cross-sectional view illustrating an example of a cross section parallel to the x-y plane in FIG. 1.

In a cross section parallel to the x-y plane, the area fraction of first layer 31 relative to the cross-sectional area of hollow cells 25 may be from 1% to 50%, for example. The area fraction of first layer 31 may be from 1% to 20%, for example. The area fraction of first layer 31 may be from 1% to 10%, for example.

For example, some of hollow cells 25 may only have the first insulation material inserted therein. For example, as illustrated in FIG. 7, hollow cells 25 adjacent to circumferential wall 24 may be filled solely with the first insulation material. This may enhance the strength of battery element 50, for example.

(Second Layer)

Outside of hollow cells 25, second layer 32 separates positive electrode 10 from negative electrode 20. Second layer 32 includes a second insulation material. For example, the second insulation material may be the same as the first insulation material. For example, the second insulation material may be different from the first insulation material. When the second insulation material is different from the first insulation material, flexibility of the method of forming second layer 32 and first layer 31 may be enhanced, for example. For example, the method of forming first layer 31 may be different from the method of forming second layer 32.

Second layer 32 may consist essentially of the second insulation material. In addition to the second insulation material, second layer 32 may further include other components. The second insulation material may be particles, for example. The second insulation material may have a median diameter from 10 nm to 1 μm, for example. The second insulation material may include an optional component. The second insulation material may include, for example, at least one selected from the group consisting of polyimide (PI), polyamide-imide (PAI), PTFE, polyethylene (PE), polypropylene (PP), and PAA.

Second layer 32 may have any thickness. The thickness of second layer 32 refers to the dimension in the z-axis direction in FIG. 6. For example, the thickness of second layer 32 may be substantially the same as the thickness of first layer 31. For example, the thickness of second layer 32 may be different from the thickness of first layer 31. For example, the thickness of second layer 32 may be greater than the thickness of first layer 31. For example, second layer 32 may have a thickness from 1 μm to 100 μm. For example, second layer 32 may have a thickness from 10 μm to 30 μm.

Carrier ion permeability through second layer 32 may be substantially the same as carrier ion permeability through first layer 31. Carrier ion permeability through second layer 32 may be different from carrier ion permeability through first layer 31. For example, carrier ion permeability through second layer 32 may be smaller than carrier ion permeability through first layer 31. This may reduce structural change caused by charge and discharge (swelling and shrinking), for example. Carrier ion permeability may be adjusted by changing, for example, the porosity of each layer, the thickness of each layer, the material of each layer (such as material type and particle size), and/or the like.

Figure 8:
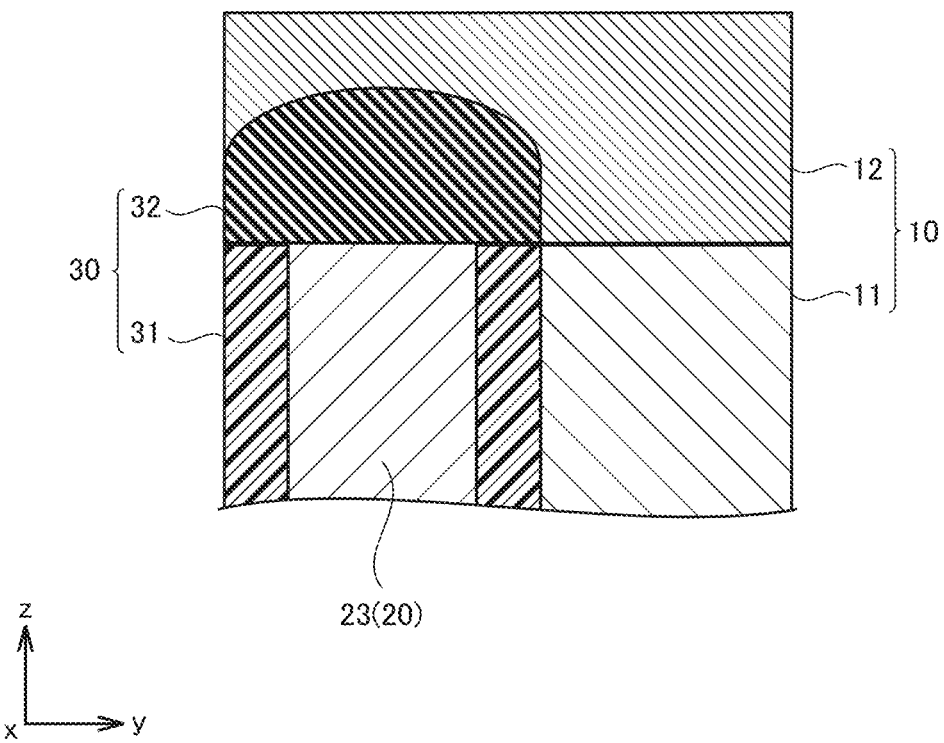
FIG. 8 is a schematic cross-sectional view illustrating an example of the configuration of the second layer according to the present embodiment.

FIG. 8 is a schematic cross-sectional view illustrating an example of the configuration of the second layer according to the present embodiment.

Like in FIG. 6, FIG. 8 illustrates a cross section parallel to the y-z plane. FIG. 8 illustrates a magnified view of the vicinity of the boundary between second layer 32 and first layer 31.

For example, the thickness of second layer 32 may be substantially uniform across the entire layer. For example, the thickness of second layer 32 may be different at some parts. For example, as illustrated in FIG. 8, second layer 32 may protrude outwardly in the z-axis direction. For example, second layer 32 may have a rounded shape. When second layer 32 has a rounded shape, stress caused by charge and discharge (swelling and shrinking) may be reduced, for example. The "rounded shape" refers to a shape that is curved without an angled vertex in a cross section parallel to the y-z plane. The rounded shape may include an arc, an elliptical arc, a hyperbola, and the like, for example.

<<Positive Electrode>>

Positive electrode 10 is an electrode that has a higher electric potential than negative electrode 20. As illustrated in FIG. 6, positive electrode 10 includes a first region 11 and a second region 12. First region 11 is inserted in hollow cells 25. First region 11 may substantially fill hollow cells 25. First region 11 may be porous. For example, first region 11 may have a through hole and/or the like formed therein.

Figure 9:
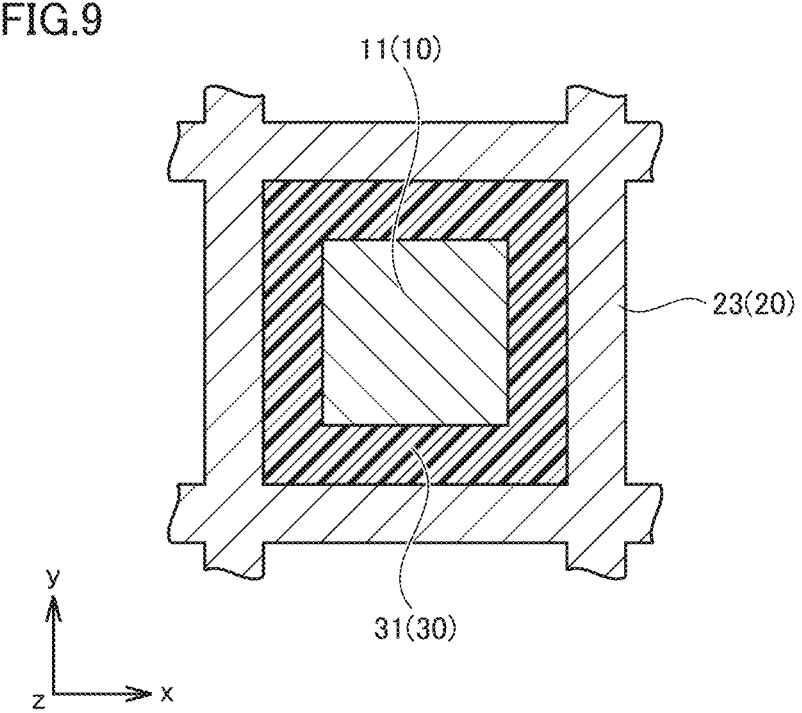
FIG. 9 is a schematic view illustrating an example of the positive electrode according to the present embodiment.

FIG. 9 is a schematic view illustrating an example of the positive electrode according to the present embodiment.

FIG. 9 illustrates a cross section parallel to the x-y plane. For example, first region 11 may have a contour similar to that of hollow cells 25. For example, in the example provided in FIG. 9, the contour of hollow cells 25 is a tetragon (square) and first region 11 is also a tetragon (square). First region 11 may have a contour not similar to that of hollow cells 25. For example, hollow cells 25 may be polygonal and first region 11 may be circular or the like.

In a cross section parallel to the x-y plane, the area fraction of first region 11 relative to the cross-sectional area of hollow cells 25 may be from 50% to 99%, for example. The area fraction of first region 11 may be from 80% to 99%, for example. The area fraction of first region 11 may be from 90% to 99%, for example.

As illustrated in FIG. 6, in a cross section parallel to the y-z plane, second region 12 extends outwardly beyond second layer 32 of separator 30. In other words, second region 12 includes a portion extending outwardly in the z-axis direction beyond second layer 32. Second region 12 may cover a surface of second layer 32. To second region 12, a positive electrode current-collecting member 41 may be connected, for example. Second region 12 may also be porous.

Figure 10:
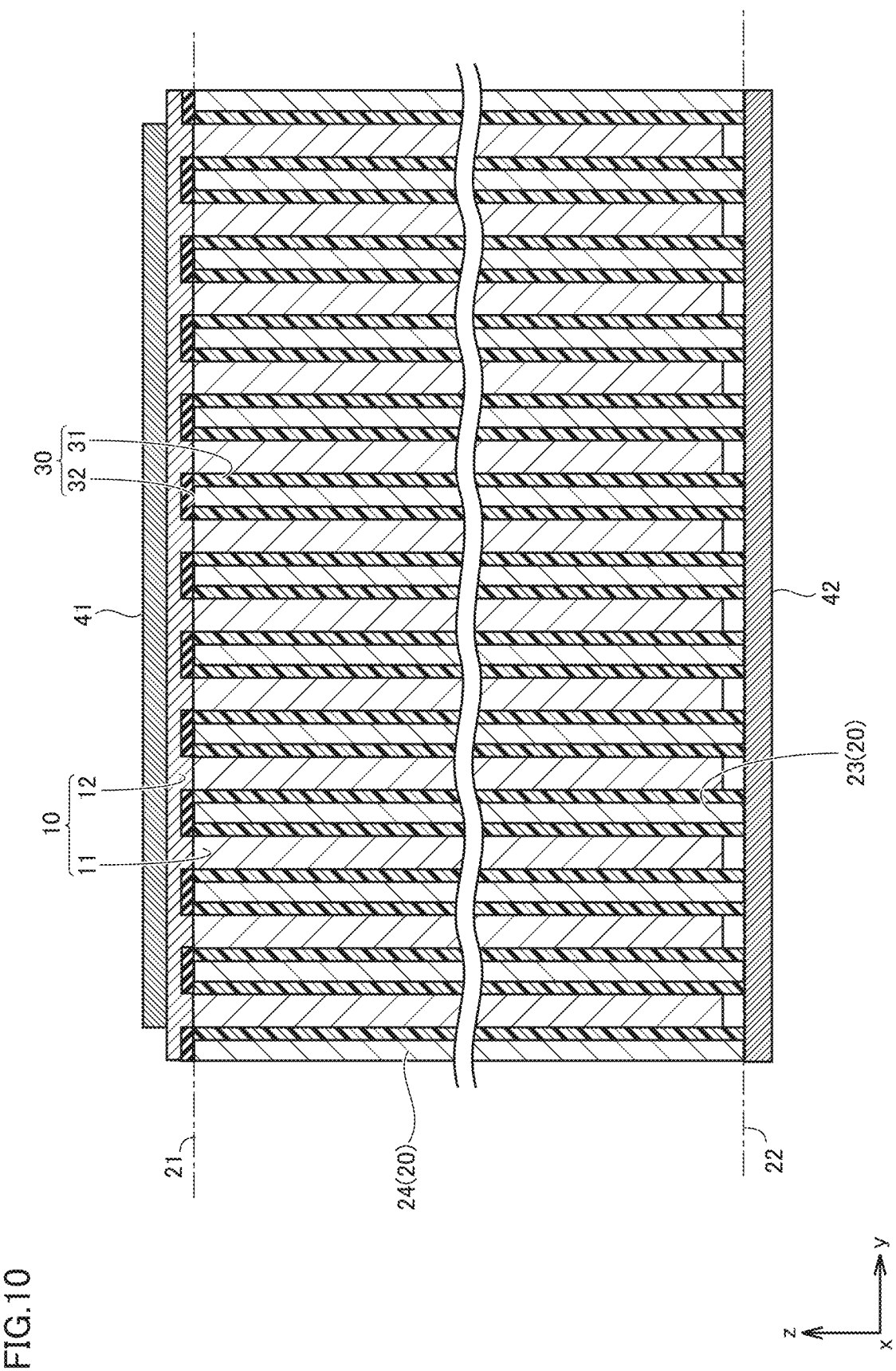
FIG. 10 is a schematic cross-sectional view illustrating an example of the positive electrode according to the present embodiment.

FIG. 10 is a schematic cross-sectional view illustrating an example of the positive electrode according to the present embodiment.

As long as second region 12 includes a portion extending outwardly in the z-axis direction beyond second layer 32, second region 12 may include a portion not extending outwardly in the z-axis direction beyond second layer 32. For example, it is acceptable that second region 12 is formed on first face 21's side and second region 12 is not formed on second face 22's side. For example, in the structure of FIG. 10, it is acceptable that positive electrode current-collecting member 41 is connected to second region 12 on first face 21's side and a negative electrode current-collecting member 42 is connected to second face 22 on second face 22's side.

First region 11 may have the same composition as that of second region 12. First region 11 may have a different composition from that of second region 12. Each of first region 11 and second region 12 includes a positive electrode active material. For example, each of first region 11 and second region 12 may consist essentially of a positive electrode active material. For example, each of first region 11 and second region 12 may include a positive electrode composite material. The positive electrode composite material may further include, in addition to the positive electrode active material, a conductive material, a binder, and the like, for example.

The positive electrode active material may be particles, for example. The positive electrode active material may have a median diameter from 1 μm to 30 μm, for example. The positive electrode active material may include an optional component. The positive electrode active material may include, for example, at least one selected from the group consisting of lithium cobalt oxide, lithium nickel oxide, lithium manganese oxide, lithium nickel cobalt manganese oxide, lithium nickel cobalt aluminate, and lithium iron phosphate. The conductive material may include an optional component. The conductive material may include, for example, at least one selected from the group consisting of carbon black, carbon fibers, metal particles, and metal fibers. The amount of the conductive material may be, for example, from 0.1 parts by mass to 10 parts by mass relative to 100 parts by mass of the positive electrode active material. The binder may include an optional component. The binder may include, for example, at least one selected from the group consisting of PVDF, PVDF-HFP, PTFE, CMC, and PAA. The amount of the binder may be, for example, from 0.1 parts by mass to 10 parts by mass relative to 100 parts by mass of the positive electrode active material.

<<Electrolyte Solution>>

Battery 100 may further include an electrolyte solution. The electrolyte solution includes a supporting electrolyte and a solvent. The supporting electrolyte is dissolved in the solvent. The supporting electrolyte may include an optional component. The supporting electrolyte may include, for example, at least one selected from the group consisting of $LiPF_6$, $LiBF_4$, and $Li(FSO_2)_2N$. The concentration of the supporting electrolyte may be from 0.5 mol/kg to 2 mol/kg, for example.

The solvent is aprotic. The solvent may include an optional component. The solvent may include, for example, at least one selected from the group consisting of ethylene carbonate (EC), propylene carbonate (PC), butylene carbonate (BC), ethyl methyl carbonate (EMC), dimethyl carbonate (DMC), and diethyl carbonate (DEC).

The electrolyte solution may further include various additives in addition to the supporting electrolyte and the solvent. The additives may include, for example, at least one selected from the group consisting of vinylene carbonate (VC), vinylethylene carbonate (VEC), 1,3-propane sultone (PS), cyclohexylbenzene (CHB), tert-amylbenzene (TAB), and lithium bis(oxalato)borate (LiBOB).

<<Current-Collecting Structure>>

As illustrated in FIG. 6 and the like, for example, battery 100 may further include positive electrode current-collecting member 41 and negative electrode current-collecting member 42. Positive electrode current-collecting member 41 electrically connects positive electrode 10 to an external terminal (not illustrated). Positive electrode current-collecting member 41 itself may also serve as an external terminal. Positive electrode current-collecting member 41 may include a metal mesh, a metal foil, a metal wire, and/or the like, for example. Positive electrode current-collecting member 41 may include Al, nickel (Ni), stainless steel (SUS), and/or the like, for example.

Negative electrode current-collecting member 42 electrically connects negative electrode 20 to an external terminal. Negative electrode current-collecting member 42 itself may also serve as an external terminal. Negative electrode current-collecting member 42 may include a metal mesh, a metal foil, a metal wire, and/or the like, for example. Negative electrode current-collecting member 42 may include Ni, Cu, and/or the like, for example.

Figure 11:
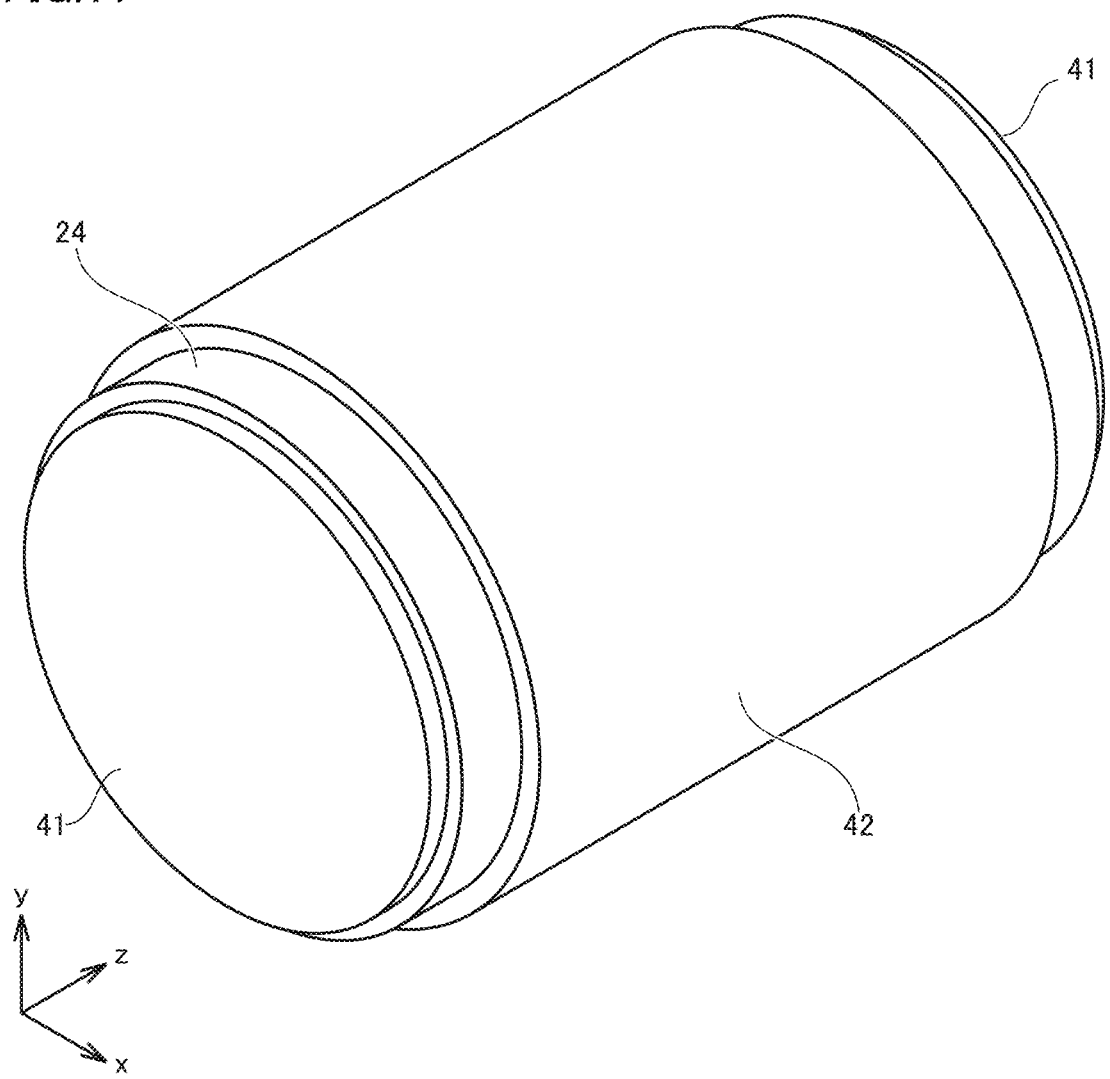
FIG. 11 is a schematic view illustrating a first example of a current-collecting structure.

FIG. 11 is a schematic view illustrating a first example of a current-collecting structure.

On both sides of the honeycomb core in a height direction of the honeycomb core (the z-axis direction), positive electrode current-collecting member 41 may be disposed. As illustrated in FIG. 6, positive electrode current-collecting member 41 is connected to second region 12 of positive electrode 10. For example, positive electrode current-collecting member 41 may be adhered to second region 12. For example, positive electrode current-collecting member 41 may be press-adhered to second region 12. For example, positive electrode current-collecting member 41 may be fused to second region 12.

Negative electrode current-collecting member 42 may be connected to circumferential wall 24 of the honeycomb core (negative electrode 20). Negative electrode current-collecting member 42 may extend across the entire circumferential wall 24. For example, negative electrode current-collecting member 42 may be adhered to the honeycomb core. For example, negative electrode current-collecting member 42 may be press-adhered to the honeycomb core. For example, negative electrode current-collecting member 42 may be fused to the honeycomb core. For example, negative electrode current-collecting member 42 may be welded to the honeycomb core.

In the current-collecting structure illustrated in FIGS. 6 and 11, positive electrode 10 may have an increased current-collecting area. This may reduce a resistance factor attributed to the positive electrode.

Figure 12:
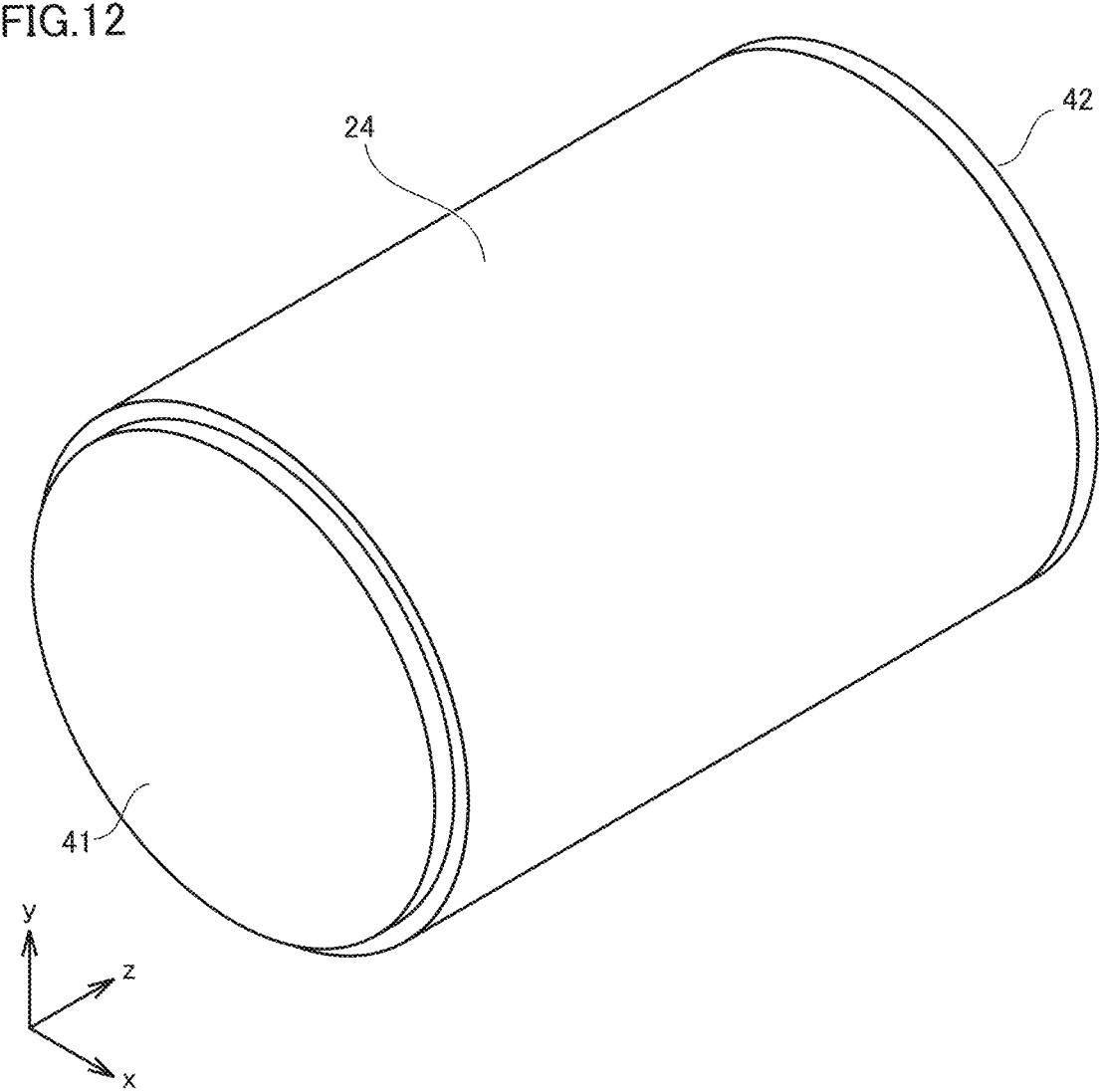
FIG. 12 is a schematic view illustrating a second example of a current-collecting structure.

FIG. 12 is a schematic view illustrating a second example of a current-collecting structure.

In the direction from first face 21 toward second face 22 (the z-axis direction), positive electrode current-collecting member 41 and negative electrode current-collecting member 42 may be on opposite sides of the honeycomb core. As illustrated in FIG. 10, on first face 21's side, positive electrode current-collecting member 41 may be connected to second region 12 of positive electrode 10. Negative electrode current-collecting member 42 may be connected to second face 22 exposed from second layer 32 of separator 30.

In the current-collecting structure illustrated in FIGS. 10 and 12, arrangement of the parts may be simplified. As a result, recyclability may be enhanced, for example.

<Method of Producing Battery>

Figure 13:
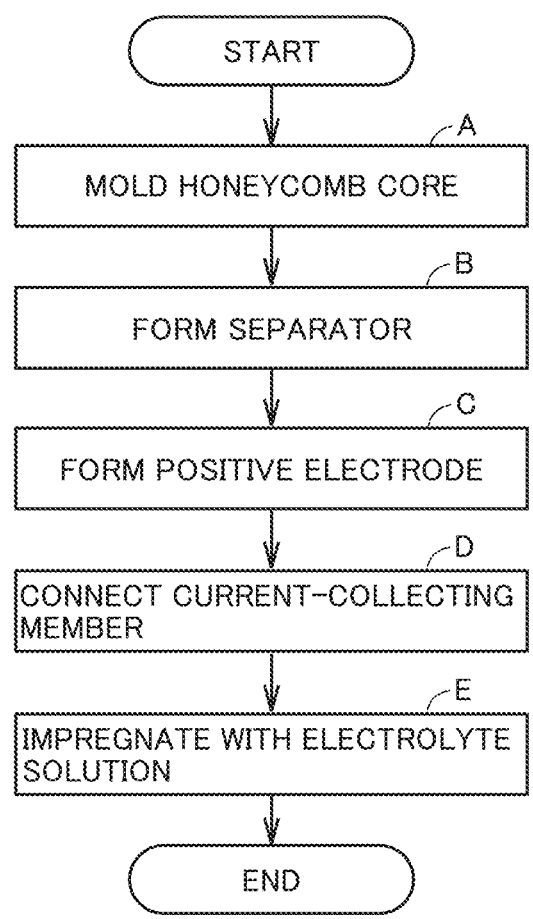
FIG. 13 is a schematic flowchart illustrating an example of the method of producing a battery according to the present embodiment.

FIG. 13 is a schematic flowchart illustrating an example of the method of producing a battery according to the present embodiment. The method of producing a battery includes "(A) molding a honeycomb core", "(B) forming a separator", and "(C) forming a positive electrode". The method of producing a battery may further include "(D) connecting a current-collecting member" and "(E) impregnating with an electrolyte solution".

<<(A) Molding Honeycomb Core>>

The method of producing a battery includes molding the honeycomb core from a negative electrode paste. The "paste" refers to a dispersion system in which solid particles are dispersed in a liquid dispersion medium. The paste may also be called "slurry", "suspension", and the like, for example.

The negative electrode paste may be prepared by, for example, mixing a negative electrode active material, a binder, and a dispersion medium. For the mixing according to the present embodiment, any mixer, any stirrer, any dispersing apparatus, and/or the like may be used. For example, a planetary mixer, an ultrasonic homogenizer, and/or the like may be used. The details of the negative electrode active material and the binder are as described above. As the dispersion medium, a suitable material may be selected in accordance with, for example, the type of the binder. For example, the dispersion medium may be water. The solid fraction of the negative electrode paste may be from 50% to 70%, for example. The "solid fraction" refers to the sum of the mass fractions of the components except the dispersion medium.

The details of the honeycomb core (negative electrode 20) are as described above. The molding the honeycomb core from a negative electrode paste may be performed by any method. For example, the molding the honeycomb core from a negative electrode paste may be performed by extrusion molding and the like. For example, a die for honeycomb core molding is prepared. The negative electrode paste is compressed and extruded from the die, and thereby a wet molded body is formed. The wet molded body is dried, and thereby a honeycomb core may be formed. For the drying according to the present embodiment, any dryer may be used. For example, a hot-air dryer, an infrared dryer, and/or the like may be used.

<<(B) Forming Separator>>

The method of producing a battery includes forming separator 30 covering a surface of the honeycomb core. Separator 30 is formed so as to include first layer 31 and second layer 32. First layer 31 and second layer 32 may be formed substantially at the same time. First layer 31 and second layer 32 may be formed sequentially.

The layers are formed by any method. The method of forming first layer 31 may be the same as the method of forming second layer 32. The method of forming first layer 31 may be different from the method of forming second layer 32.

For example, a separator paste may be prepared. The separator paste may be prepared by, for example, mixing a first insulation material, a binder, and a dispersion medium. The details of the first insulation material and the binder are as described above. As the dispersion medium, a suitable material may be selected in accordance with, for example, the type of the binder. The dispersion medium may be N-methyl-2-pyrrolidone (NMP), for example. The solid fraction of the separator paste may be from 40% to 70%, for example.

For example, the separator paste may be injected into the honeycomb core. or example, a syringe and/or the like may be used. The syringe includes a barrel and a plunger. For example, the honeycomb core is secured within the barrel. Within the barrel, the separator paste is placed between the honeycomb core and the plunger. The plunger is operated to press the separator paste into the honeycomb core (hollow cells 25). After the injection, the separator paste is dried. Thus, first layer 31 may be formed. First layer 31 is formed so as to cover at least part of partition 23. For example, the injection may be repeated to adjust the thickness of first layer 31.

For example, the separator paste may be sucked into the honeycomb core. For example, a vacuum pump is used to suck the separator paste from the first face 21 or second face 22 of the honeycomb core. After the suction, the separator paste is dried. Thus, first layer 31 covering partition 23 may be formed. For example, the suction may be repeated to adjust the thickness of first layer 31.

For example, an electrodeposition paint including a second insulation material may be prepared. For example, at least one of first face 21 and second face 22 of the honeycomb core is immersed in the electrodeposition paint. A predetermined voltage is applied between the honeycomb core and the counter electrode, and thereby the second insulation material is deposited on the honeycomb core. After the electrodeposition, the electrodeposition paint is dried. Thus, second layer 32 is formed. Second layer 32 is formed so as to cover at least one of first face 21 and second face 22. For example, the electrodeposition duration and the like may be changed to adjust the thickness of second layer 32

<<(C) Forming Positive Electrode>>

The method of producing a battery includes, after the forming separator 30, forming positive electrode 10 by injecting a positive electrode paste into hollow cells 25 within the honeycomb core. Positive electrode 10 is formed so as to include first region 11 and second region 12. First region 11 and second region 12 may be formed substantially at the same time. First region 11 and second region 12 may be formed sequentially.

The positive electrode paste may be prepared by, for example, mixing a positive electrode active material, a conductive material, a binder, and a dispersion medium. The details of the positive electrode active material, the conductive material, and the binder are as described above. As the dispersion medium, a suitable material may be selected in accordance with, for example, the type of the binder. The dispersion medium may be NMP, for example. The solid fraction of the positive electrode paste may be from 50% to 80%, for example.

For example, the positive electrode paste may be injected into the honeycomb core. For example, as in the method of forming separator 30, a syringe and/or the like may be used. For example, the positive electrode paste may be sucked into the honeycomb core. For example, as in the method of forming separator 30, a vacuum pump and/or the like may be used. After the injection or suction, the positive electrode paste is dried.

Part of the positive electrode paste is inserted into hollow cells 25. Thus, first region 11 is formed. For example, the positive electrode paste discharged from hollow cells 25 may form second region 12. For example, an extra positive electrode paste may be applied to form second region 12. In a cross section perpendicular to first face 21 (for example, in FIG. 6), second region 12 extends outwardly beyond second layer 32 of separator 30. In this configuration, a short circuit between second region 12 (positive electrode 10) and first face 21 (negative electrode 20) and the like may be inhibited by second layer 32 (separator 30). Second region 12 (positive electrode 10) may be formed so as to cover second layer 32 (separator 30). In this way, battery element 50 is formed.

<<(D) Connecting Current-Collecting Member>>

The method of producing a battery may further include connecting positive electrode current-collecting member 41 to positive electrode 10 and connecting negative electrode current-collecting member 42 to negative electrode 20.

The details of positive electrode current-collecting member 41 and negative electrode current-collecting member 42 are as described above. For example, as positive electrode current-collecting member 41, an Al foil, an Al mesh, and/or the like may be prepared. For example, positive electrode current-collecting member 41 may be adhered to second region 12. For adhering positive electrode current-collecting member 41 to second region 12, a positive electrode paste and/or the like may be used, for example.

For example, as negative electrode current-collecting member 42, a flat Ni wire and/or the like may be prepared. For example, a flat Ni wire may be wound around circumferential wall 24. For example, resistance welding may be employed to weld negative electrode current-collecting member 42 to circumferential wall 24.

<<(E) Impregnating with Electrolyte Solution>>

The method of producing a battery may include impregnating battery element 50 with an electrolyte solution. For example, a battery casing is prepared. The details of the battery casing are as described above. Battery element 50 is accommodated in the battery casing.

An electrolyte solution is prepared. The details of the electrolyte solution are as described above. A predetermined amount of the electrolyte solution is injected into the battery casing. Thus, battery element 50 may be impregnated with the electrolyte solution. After the injection of the electrolyte solution, the battery casing is hermetically sealed. In this way, battery 100 is produced.

EXAMPLES

Hereinafter, examples according to the present disclosure (hereinafter also called "the present example") will be described. It should be noted that the below description does not limit the scope of claims.

<Producing Test Battery>

By the below procedure, test batteries No. 1 to No. 8 were produced.

<<(A) Molding Honeycomb Core>>

The below materials were prepared.

Negative electrode active material: graphite (median diameter, 15 μm)

Binder: CMC

Dispersion medium: ion-exchanged water 100 parts by mass of the negative electrode active material, 10 parts by mass of the binder, and 60 parts by mass of the dispersion medium were mixed to prepare a negative electrode paste.

A die for honeycomb core molding was prepared. The negative electrode paste was compressed and extruded from the die to form a wet molded body. The wet molded body was dried to form a honeycomb core (negative electrode 20). The drying temperature was 120° C. The drying duration was 3 hours.

Figure 14:
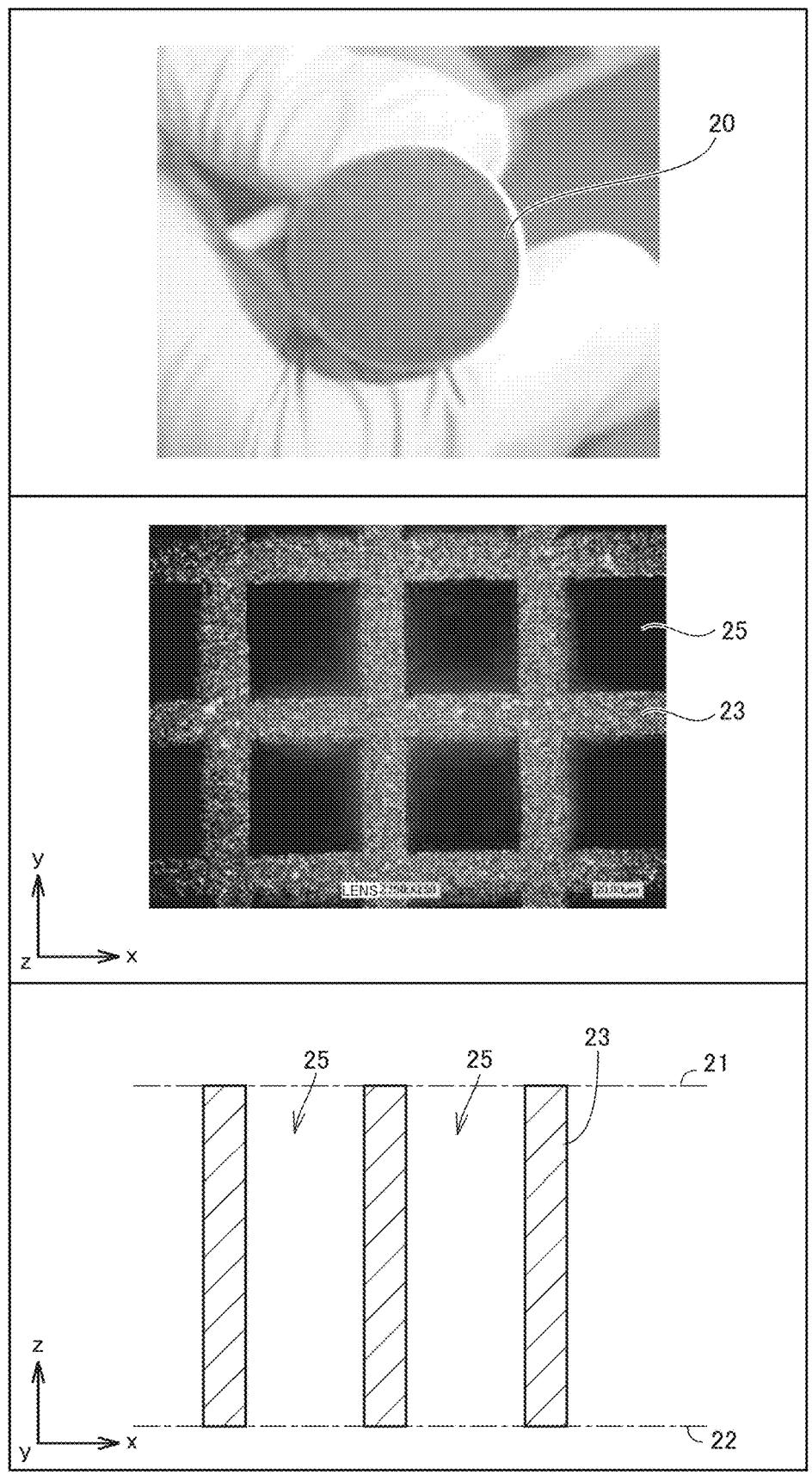
FIG. 14 is a first descriptive view illustrating the production process of a test battery according to the present example.

FIG. 14 is a first descriptive view illustrating the production process of a test battery according to the present example.

The top image in FIG. 14 is a photograph. The middle image in FIG. 14 is an optical micrograph of a cross section parallel to first face 21. The bottom in FIG. 14 is a schematic view.

As seen in the photographic image in FIG. 14, the honeycomb core according to the present example had a cylinder shape. The diameter of the honeycomb core (d) was 20 mm. The height of the honeycomb core (h) of No. 1 was 10 mm.

The cross-sectional profile of hollow cells 25 was square. The length of each side of the square was 260 μm. The thickness of partition 23 (t) was 140 μm. The density of the honeycomb core was estimated from the mass and dimension of the material, as 1.24 g/cm$^3$.

<<(B) Forming Separator>>

The below materials were prepared.

First insulation material: boehmite (median diameter, 100 nm)

Binder: PVDF (trade name "KF polymer", Grade "#8500", manufactured by Kureha)

Dispersion medium: NMP 45 parts by mass of the first insulation material, 4 parts by mass of the binder, and 40 parts by mass of the dispersion medium were mixed to prepare a separator paste. About 4 g to 5 g of the separator paste was placed on first face 21 of the honeycomb core. A vacuum pump was used to suck the separator paste from second face 22's side into the honeycomb core. Thus, the separator paste was applied to partition 23. After the suction, the separator paste was dried. Thus, first layer 31 was formed. The drying temperature was 120° C. The drying duration was 15 minutes. After the separator paste was dried, some of hollow cells 25 were found to be closed by the first insulation material. Therefore, first face 21 and second face 22 were polished to open hollow cells 25.

Figure 15:
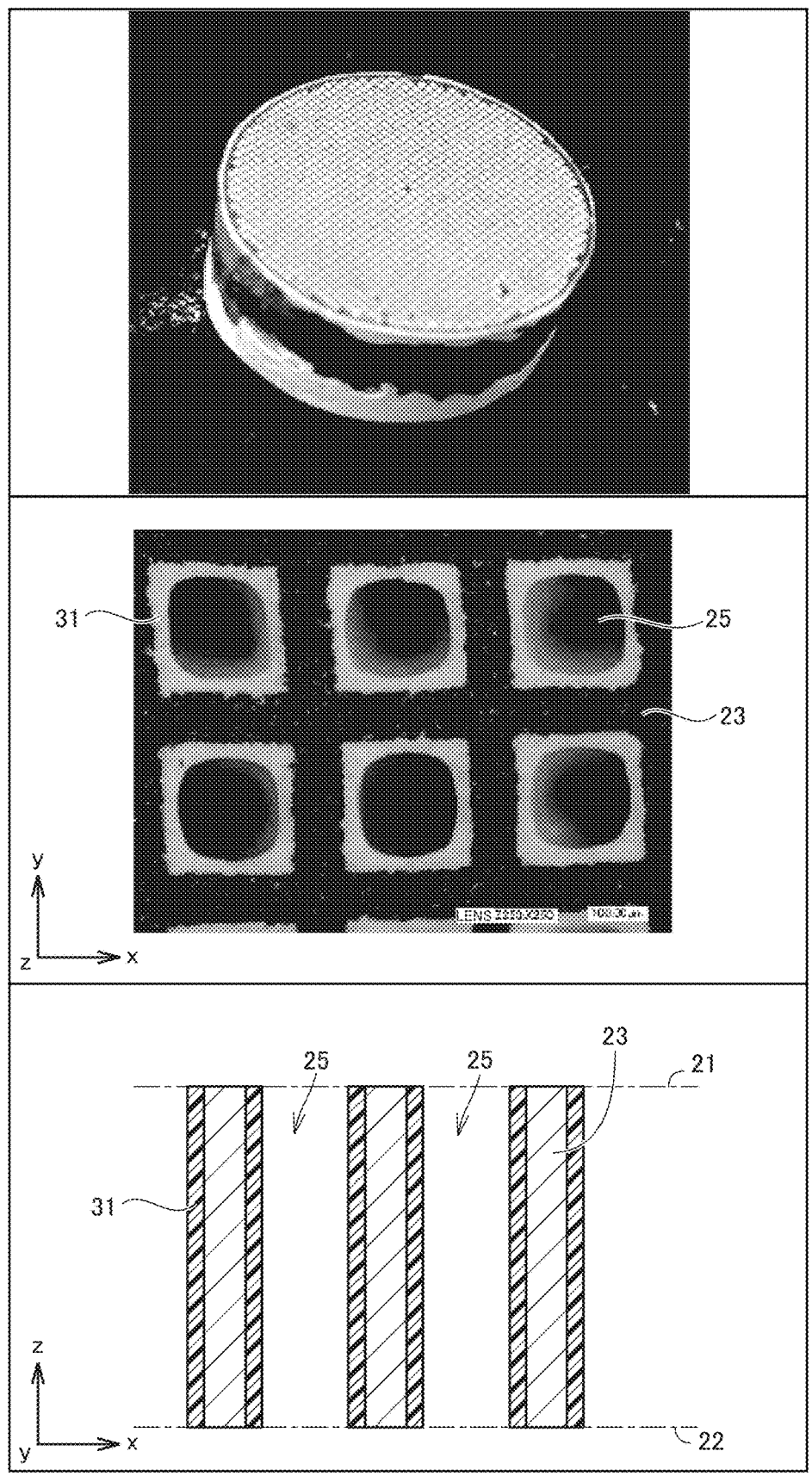
FIG. 15 is a second descriptive view illustrating the production process of a test battery according to the present example.

FIG. 15 is a second descriptive view illustrating the production process of a test battery according to the present example.

The top image in FIG. 15 is a photograph. The middle image in FIG. 15 is an optical micrograph of a cross section parallel to first face 21. The bottom in FIG. 15 is a schematic view.

As seen in the optical micrograph in FIG. 15, first layer 31 covered partition 23. In the present example, the thickness of first layer 31 was about 20 μm.

An electrodeposition paint (trade name "Elecoat PI", manufactured by Shimizu) was prepared. The electrodeposition paint included a dispersoid and a dispersion medium. The dispersoid included resin particles (polyimide). The dispersion medium included water. The resin particles correspond to a second insulation material. As negative electrode current-collecting member 42, a flat Ni wire (thickness, 50 μm; width, 3 mm) was prepared. Negative electrode current-collecting member 42 was wound around circumferential wall 24 of the honeycomb core. By resistance welding, negative electrode current-collecting member 42 was welded to circumferential wall 24. Negative electrode current-collecting member 42 was connected to a power supply. The honeycomb core was immersed in the electrodeposition paint. In order to make the honeycomb core serve as a negatively-charged electrode, a voltage of 30 V was applied. Electrodeposition was performed for 2 minutes. By this, the second insulation material was made to deposit on first face 21 and second face 22, and thereby second layer 32 was formed. After the electrodeposition, the honeycomb core was gently rinsed with water to substantially remove excess electrodeposition paint. After the rinsing, the honeycomb core was subjected to heat treatment. The heat treatment temperature was 180° C. The heat treatment duration was 1 hour.

Figure 16:
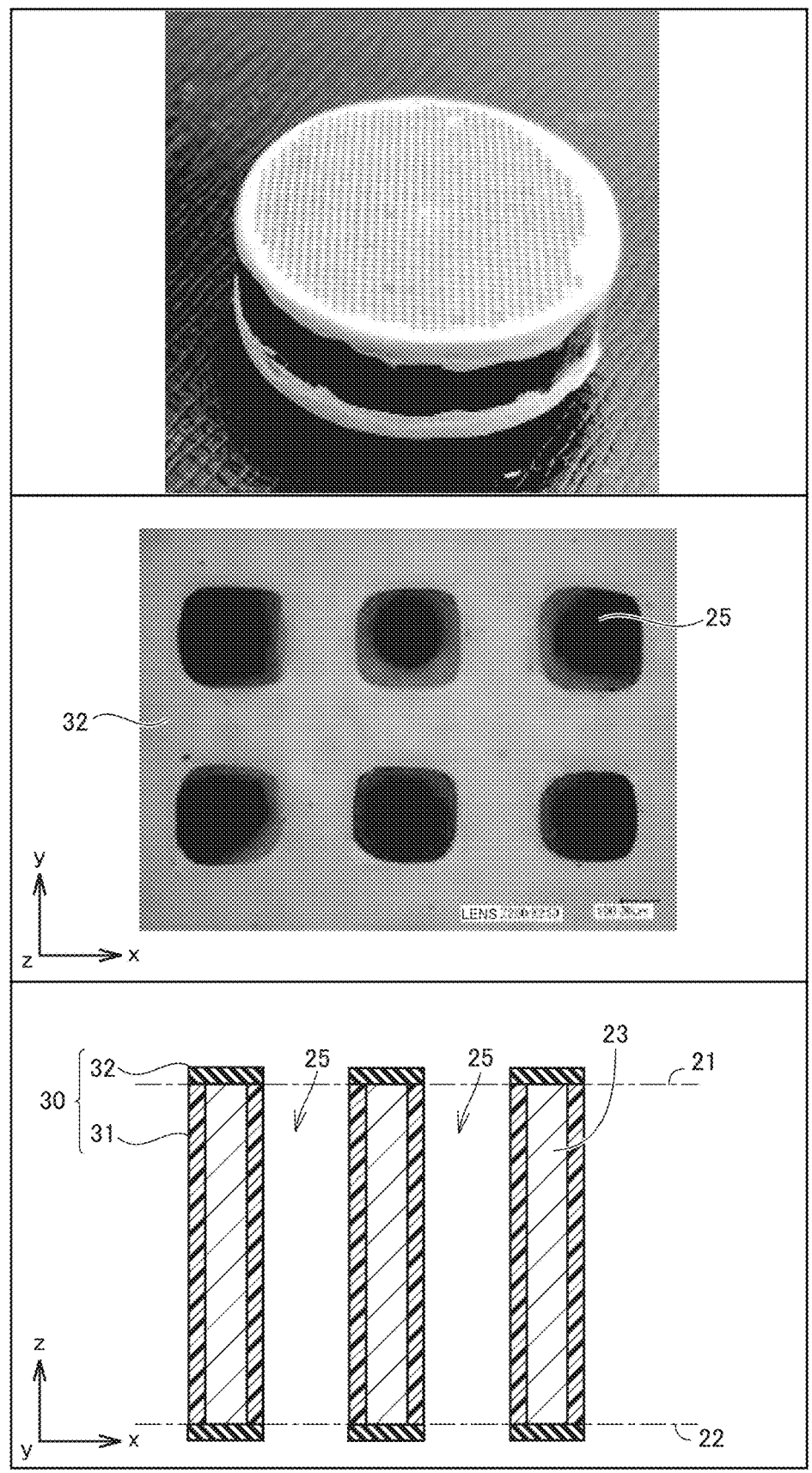
FIG. 16 is a third descriptive view illustrating the production process of a test battery according to the present example.

FIG. 16 is a third descriptive view illustrating the production process of a test battery according to the present example.

The top image in FIG. 16 is a photograph. The middle image in FIG. 16 is an optical micrograph of the upper side of the honeycomb core. The bottom in FIG. 16 is a schematic view.

As seen in the optical micrograph in FIG. 16, second layer 32 covered first face 21 and second face 22. Second layer 32 was in connection with first layer 31.

<<(C) Forming Positive Electrode>>
The below materials were prepared.
Positive electrode active material: lithium cobalt oxide (median diameter, 10 μm)
Conductive material: acetylene black
Binder: PVDF (trade name "KF polymer", Grade "#1300", manufactured by Kureha)
Dispersion medium: NMP 64 parts by mass of the positive electrode active material, 4 parts by mass of the conductive material, 2 parts by mass of the binder, and 30 parts by mass of the dispersion medium were mixed to prepare a positive electrode paste. A plastic syringe was prepared. Within the barrel of the syringe, the honeycomb core was secured. Within the barrel, between the honeycomb core and the plunger, about 3.5 g of the positive electrode paste was placed. The plunger was operated to press the positive electrode paste into the honeycomb core. In other words, the positive electrode paste was inserted into hollow cells 25. At the time when the positive electrode paste was discharged from the opening on the side opposite to the pressed side, plunger pressing was stopped. After the positive electrode paste was inserted, the honeycomb core was taken out of the barrel. The honeycomb core was dried. The drying temperature was 120° C. The drying duration was 30 minutes. In this way, positive electrode 10 was formed. The density of positive electrode 10 was estimated from the mass, dimension, and the like of the material, as 1.95 g/cm³. In this way, battery element 50 was formed.

Figure 17:
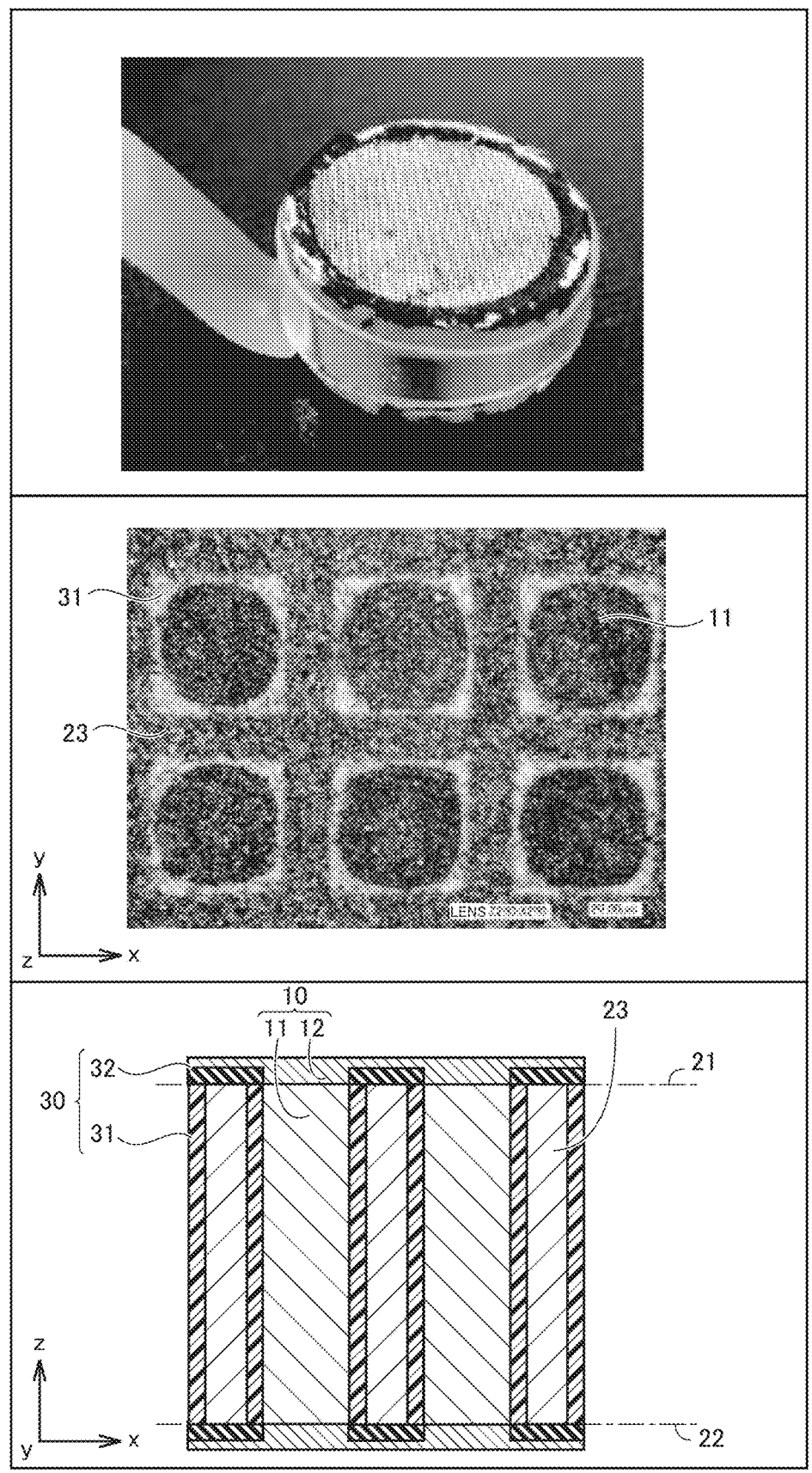
FIG. 17 is a fourth descriptive view illustrating the production process of a test battery according to the present example.
Figure 18:
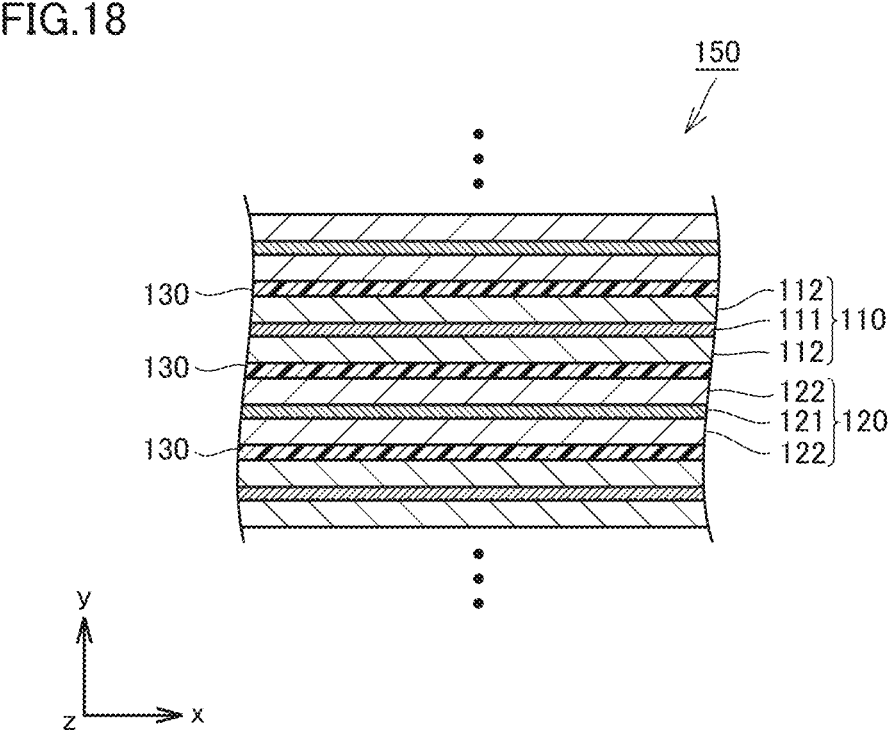
FIG. 18 is a schematic cross-sectional view illustrating an example of a conventional battery element.

FIG. 17 is a fourth descriptive view illustrating the production process of a test battery according to the present example.

The top image in FIG. 17 is a photograph. The middle image in FIG. 17 is an optical micrograph of a cross section parallel to first face 21. The bottom in FIG. 17 is a schematic view.

Positive electrode 10 included first region 11 and second region 12. As seen in the optical micrograph in FIG. 17, first region 11 was inserted in hollow cells 25. Second region 12 extended outwardly beyond second layer 32 of separator 30. Second region 12 covered second layer 32.

<<(D) Connecting Current-Collecting Member>>
As positive electrode current-collecting member 41, an Al foil (thickness, 15 μm) was prepared. Positive electrode current-collecting member 41 was die-cut into a circular shape (diameter, 25 mm). On both sides of the honeycomb core in a height direction of the honeycomb core, positive electrode current-collecting member 41 was disposed. About 0.5 g of the positive electrode paste was used to adhere positive electrode current-collecting member 41 to second region 12 (positive electrode 10).

As described above, in the present example, negative electrode current-collecting member 42 was connected to circumferential wall 24 (negative electrode 20) at the time of forming second layer 32 (at the time of electrodeposition).

As external terminals, SUS tabs were prepared. The SUS tabs were welded to positive electrode current-collecting member 41 and negative electrode current-collecting member 42, respectively.

<<(E) Impregnating with Electrolyte Solution>>
An electrolyte solution including the below components was prepared.
Supporting electrolyte: $LiPF_6$ (concentration, 1 mol/kg)
Solvent: EC/EMC/DMC=1/1/1 (volume ratio)

As a battery casing, a pouch made of an Al-laminated film was prepared. Battery element 50 was accommodated into the battery casing. 5 g of the electrolyte solution was injected into the battery casing. After the injection of the electrolyte solution, the battery casing was hermetically sealed using a vacuum sealer. In this way, test battery No. 1 was produced.

Test batteries No. 2 to No. 9 were produced in the same manner as No. 1 except that the height of the honeycomb core (h), the thickness of partition 23 (t), and the cross-sectional area of hollow cells 25 were changed as specified in Table 1 below.

<Charge-Discharge Test>
Under the below conditions, discharged capacity of the test batteries was measured. Results are illustrated in Table 1 below.
Charge: CCCV mode, CC current=200 mA, CV voltage=4.2 V, Cutoff current=10 mA
Discharge: CCCV mode, CC current=200 mA, CV voltage=3 V, Cutoff current=10 mA "CCCV mode" refers to a constant current-constant voltage mode. "CC current" refers to the current during constant-current charging. "CV voltage" refers to the voltage during constant-voltage charging. During constant-voltage charging or constant-voltage discharging, the electric current decays. When the electric current has decayed to reach "Cutoff current", charging or discharging is stopped.

TABLE 1

| | Honeycomb core (negative electrode) | | | Charge-discharge test |
|---|---|---|---|---|
| No. | Height (h) mm | Partition thickness (t) μm | Cross-sectional area of hollow cells μm² | Discharged capacity mAh |
| 1 | 10 | 140 | 67600 | 593 |
| 2 | 10 | 20 | 900 | 520 |
| 3 | 10 | 350 | 250000 | 671 |
| 4 | 3 | 140 | 67600 | 172 |
| 5 | 10 | 350 | 490000 | 258 |
| 6 | 10 | 15 | 625 | — |
| 7 | 10 | 520 | 640000 | 25 |
| 8 | 2 | 140 | 67600 | — |
| 9 | 1 | 140 | 67600 | — |

<Results>
As seen in Table 1 above, the test batteries according to the present example were capable of charge and discharge. In the present example, a current-collecting member (a current collector) is positioned outside battery element 50. Therefore, detaching the current-collecting member is easy, potentially achieving an excellent recyclability. Further, because positive electrode 10 and negative electrode 20 are three-dimensionally adjacent to each other, the facing area between positive electrode 10 and negative electrode 20 may be increased. Therefore, intended battery resistance may still be achieved with a reduced current collector. Thus, the test batteries according to the present example may have a structure in which a current collector can be reduced.

No. 6 has a thickness of partition 23 (t) of less than 20 μm. In No. 6, a short circuit occurred during charging and discharging and thereby discharged capacity could not be measured. After the charge-discharge test, the test battery was disassembled and battery element 50 was checked. Then, it was found that a part of partition 23 was broken. It is considered that during charging, the negative electrode active material could have swollen to apply stress to partition 23. For example, the thickness of partition 23 (t) may be selected in accordance with the stress to be applied during charging.

No. 7 has a thickness of partition 23 (t) exceeding 350 μm. No. 7 had a low charged capacity and a low discharged capacity. Although the reason why the capacity of No. 7 decreased is not specified, the following reason, for example, can be considered based on a mere presumption: the increase in the thickness of partition 23 (t) and the cross-sectional area of hollow cells 25 could have caused an increase in ionic conduction resistance to reduce the activity of the charge-discharge reaction. For example, the thickness of partition 23 (t) and the cross-sectional area of hollow cells 25 may be adjusted so as to obtain a desired ionic conduction resistance.

Each of No. 8 and No. 9 had a height of the honeycomb core (h) of less than 3 mm. In No. 8, a short circuit occurred during charging and discharging and thereby discharged capacity could not be measured. In No. 9, the honeycomb core was broken at the time of injection of the positive electrode paste and thereby discharged capacity could not be measured.

From the above results, by adjusting the height of the honeycomb core (h), the thickness of partition 23 (t), and the cross-sectional area of hollow cells 25, for example, a battery with desired performance may be provided.

The present embodiment and the present example are illustrative in any respect. The present embodiment and the present example are non-restrictive. For example, it is expected that certain configurations of the present embodiments and the present examples can be optionally combined.

The technical scope defined by the terms of the claims encompasses any modifications within the meaning equivalent to the terms of the claims. The technical scope defined by the terms of the claims also encompasses any modifications within the scope equivalent to the terms of the claims.

What is claimed is:

1. A battery comprising:
   a positive electrode;
   a negative electrode; and
   a separator,
     the negative electrode forming a honeycomb core,
     the honeycomb core including a first face, a second face, a partition, and a circumferential wall,
     the second face facing the first face,
     the partition being formed between the first face and the second face,
     in a cross section parallel to the first face, the partition extending in a grid pattern to separate a plurality of hollow cells,
     in the cross section parallel to the first face, the circumferential wall surrounding a circumference of the partition,
     each of the hollow cells penetrating the honeycomb core in a direction from the first face toward the second face,
   the separator spatially separating the positive electrode from the negative electrode,
   the separator including a first layer and a second layer, wherein the first layer includes a first insulation particle material, the second layer includes a second insulation particle material, and the second insulation particle material is different from the first insulation particle material,
     the first layer covering at least part of the partition,
     the second layer covering at least part of the first face and at least a part of the second face,
   the positive electrode including a first region and a second region,
     the first region being inserted in the hollow cells,
     in a cross section perpendicular to the first face, the second region extending outwardly beyond the second layer of the separator, and
   the battery further includes an electrolyte solution distinct from the separator.

2. The battery according to claim 1, wherein
   the honeycomb core has a height of 3 mm or more, and
   the height represents a distance between the first face and the second face.

3. The battery according to claim 1, wherein in the cross section parallel to the first face, each of the hollow cells has a cross-sectional area of 900 μm$^2$ or more.

4. The battery according to claim 1, wherein in the cross section parallel to the first face, each of the hollow cells has a tetragonal contour or a hexagonal contour.

5. The battery according to claim 1, wherein the partition has a thickness from 20 μm to 350 μm.

6. The battery according to claim 1, wherein
   the battery further comprises:
   a positive electrode current-collecting member; and
   a negative electrode current-collecting member,
   the positive electrode current-collecting member is connected to the second region of the positive electrode, and
   the negative electrode current-collecting member is connected to the circumferential wall.

7. The battery according to claim 1, wherein
   the battery further comprises:
   a positive electrode current-collecting member; and
   a negative electrode current-collecting member,
   in the direction from the first face toward the second face, the positive electrode current-collecting member and the negative electrode current-collecting member are on opposite sides of the honeycomb core,
   the positive electrode current-collecting member is connected to the second region of the positive electrode, and
   the negative electrode current-collecting member is connected to the second face exposed from the second layer.

8. A method of producing a battery including a negative electrode forming a honeycomb core,
   the honeycomb core including a first face, a second face, a partition, and a circumferential wall,
   the second face facing the first face,
   the partition being formed between the first face and the second face,
   in a cross section parallel to the first face, the partition extending in a grid pattern to separate a plurality of hollow cells,
   in the cross section parallel to the first face, the circumferential wall surrounding a circumference of the partition,
   each of the hollow cells penetrating the honeycomb core in a direction from the first face toward the second face,
   the method of producing a battery comprising:
   (A) molding the honeycomb core from a negative electrode paste;
   (B) forming a separator covering a surface of the honeycomb core; and
   (C) after the forming the separator, forming a positive electrode by injecting a positive electrode paste into the hollow cells within the honeycomb core, the separator being formed so as to spatially separate the positive electrode from the negative electrode, the separator being formed so as to include a first layer and a second layer, wherein the first layer includes a first insulation particle material, the second layer includes a second insulation particle material, and the second insulation particle material is different from the first insulation particle material, the first layer covering at least part of the partition, the second layer covering at least part of the first face and at least a part of the second face, the positive electrode being formed so as to include a first region and a second region, the first region being inserted in the hollow cells, in a cross section perpendicular to the first face, the second region extending outwardly beyond the second layer of the separator, and the battery being made to further include an electrolyte solution distinct from the separator.

9. The method of producing a battery according to claim 8, wherein the molding the honeycomb core from a negative electrode paste is performed by extrusion molding.

10. The method of producing a battery according to claim 8, wherein the first layer is formed by sucking a separator paste from the first face or the second face into the honeycomb core, and the separator paste includes the first insulation particle material.

11. The method of producing a battery according to claim 8, wherein the second layer is formed by depositing the second insulation particle material on the first face and on the second face by electrodeposition.

12. The method of producing a battery according to claim 8, wherein the method further includes:

(D) connecting a positive electrode current-collecting member to the positive electrode; and connecting a negative electrode current-collecting member to the negative electrode, the positive electrode current-collecting member is connected to the second region of the positive electrode, and the negative electrode current-collecting member is connected to the circumferential wall.

13. The method of producing a battery according to claim 8, wherein the method further includes:

(D) connecting a positive electrode current-collecting member to the positive electrode; and connecting a negative electrode current-collecting member to the negative electrode, in the direction from the first face toward the second face, the positive electrode current-collecting member and the negative electrode current-collecting member are on opposite sides of the honeycomb core, the positive electrode current-collecting member is connected to the second region of the positive electrode, and the negative electrode current-collecting member is connected to the second face exposed from the second layer.

14. The battery according to claim 1, wherein the electrolyte solution is comprised of a supporting electrolyte dissolved in an aprotic solvent.

15. The battery according to claim 14, wherein the supporting electrolyte is at least one selected from the group consisting of $LiPF_6$, $LiBF_4$, and $Li(FSO_2)_2N$ present in the electrolyte solution at a concentration of from 0.5 mol/kg to 2 mol/kg.

16. The battery according to claim 1, wherein the second layer has a shape in which a side of the second layer opposite a side of the second layer covering the first face or the second face protrudes outwardly away from the first face or from the second face in a rounded shape.

17. The battery according to claim 1, wherein, in the cross section perpendicular to the first face, the second layer of the separator protrudes outwardly such that a tip of the second layer has a rounded shape.

\* \* \* \* \*